(12) United States Patent
Iwaji et al.

(10) Patent No.: US 8,878,480 B2
(45) Date of Patent: Nov. 4, 2014

(54) SYNCHRONOUS MOTOR DRIVE SYSTEM AND SYNCHRONOUS MOTOR

(75) Inventors: Yoshitaka Iwaji, Hitachinaka (JP); Shigehisa Aoyagi, Hitachinaka (JP); Kazuaki Tobari, Hitachiota (JP); Ryoichi Takahata, Hitachi (JP); Masaki Hano, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 78 days.

(21) Appl. No.: 13/559,267

(22) Filed: Jul. 26, 2012

(65) Prior Publication Data

US 2013/0057193 A1 Mar. 7, 2013

(30) Foreign Application Priority Data

Sep. 1, 2011 (JP) ................................. 2011-190866

(51) Int. Cl.
*H02P 25/00* (2006.01)
*H02P 23/00* (2006.01)

(52) U.S. Cl.
USPC . 318/721; 318/439; 318/400.11; 318/400.33; 318/400.35

(58) Field of Classification Search
USPC .......... 318/721, 439, 400.11, 400.26, 400.33, 318/400.35
See application file for complete search history.

(56) References Cited

U.S. PATENT DOCUMENTS

| | | | | |
|---|---|---|---|---|
| 5,834,911 A | * | 11/1998 | Kimura | 318/400.11 |
| 5,857,349 A | * | 1/1999 | Hamaoka et al. | 62/228.4 |
| 5,886,486 A | * | 3/1999 | Jeong et al. | 318/400.13 |
| 6,008,619 A | * | 12/1999 | Murase et al. | 318/811 |
| 6,014,004 A | * | 1/2000 | Hamaoka et al. | 318/778 |
| 6,191,545 B1 | | 2/2001 | Kawabata et al. | |
| 6,674,258 B2 | * | 1/2004 | Sakai et al. | 318/400.28 |
| 6,903,523 B2 | * | 6/2005 | Peterson | 318/400.09 |
| 6,979,970 B2 | * | 12/2005 | Iwanaga et al. | 318/400.35 |
| 7,768,226 B2 | | 8/2010 | Fukamizu et al. | |
| 8,258,732 B2 | * | 9/2012 | Iwaji et al. | 318/400.11 |
| 2002/0195981 A1 | * | 12/2002 | Sakai et al. | 318/439 |
| 2003/0123178 A1 | * | 7/2003 | Gotou et al. | 360/73.03 |
| 2004/0245953 A1 | * | 12/2004 | Peterson | 318/439 |
| 2004/0263104 A1 | * | 12/2004 | Iwanaga et al. | 318/439 |
| 2007/0194730 A1 | | 8/2007 | Fukamizu et al. | |
| 2008/0226474 A1 | | 9/2008 | Yoshida et al. | |

(Continued)

FOREIGN PATENT DOCUMENTS

CN 1280717 A 1/2001
CN 101026351 A 8/2007

(Continued)

OTHER PUBLICATIONS

Japanese Office Action with partial English translation dated Sep. 10, 2013 (Sixteen (16) pages).

(Continued)

*Primary Examiner* — Paul Ip
(74) *Attorney, Agent, or Firm* — Crowell & Moring LLP

(57) ABSTRACT

In sequentially selecting and driving two phases of the three-phase stator windings of a synchronous motor, detect a speed electromotive voltage of a de-energized phase, relate the speed electromotive voltage to rotor position information beforehand, then count rotor position information backward based on the detected the speed electromotive voltage to estimate rotor position; and then detect rotation speed from the change rate of the rotor position information so as to achieve highly accurate position and speed control.

6 Claims, 25 Drawing Sheets

(56) References Cited

U.S. PATENT DOCUMENTS

| | | | |
|---|---|---|---|
| 2009/0200971 A1* | 8/2009 | Iwaji et al. | 318/400.11 |
| 2010/0066284 A1 | 3/2010 | Iwaji et al. | |
| 2012/0306416 A1* | 12/2012 | Hano | 318/400.26 |
| 2013/0043817 A1* | 2/2013 | Shibuya et al. | 318/400.33 |
| 2013/0243625 A1* | 9/2013 | Iwaji et al. | 417/410.1 |

FOREIGN PATENT DOCUMENTS

| | | |
|---|---|---|
| JP | 7-123773 A | 5/1995 |
| JP | 8-98582 A | 4/1996 |
| JP | 11-341869 A | 12/1999 |
| JP | 2004-364473 A | 12/2004 |
| JP | 2007-252066 A | 9/2007 |
| JP | 2009-189176 A | 8/2009 |
| JP | 2010-74898 A | 4/2010 |
| JP | 2011-30385 A | 2/2011 |
| WO | WO 2007/072561 A1 | 6/2007 |
| WO | WO 2012/029451 A1 | 3/2012 |

OTHER PUBLICATIONS

Chinese Office Action dated Jul. 1, 2014 with English translation (22 pages).

* cited by examiner

POSITIVE PULSE

NEGATIVE PULSE

TABLE 1
(MODE 1, 3, 5)

TABLE 2
(MODE 2, 4, 6)

SYNCHRONOUS MOTOR DRIVE SYSTEM AND SYNCHRONOUS MOTOR

CLAIM OF PRIORITY

The present application claims priority from Japanese Patent applications serial No. 2011-190866, filed on Sep. 1, 2011, the respective contents of which are hereby incorporated by reference into this application.

TECHNICAL FIELD

The present invention relates to synchronous motor drive systems and, in particular, to a synchronous motor drive system suitable for estimating the position of the rotor's magnetic pole without using a position sensor and controlling the number of rotations and torque of the synchronous motor. The present invention also relates to a synchronous motor equipped with the drive system.

BACKGROUND ART

In the home electric appliance, industrial equipment, and automobile industries, electric motor drive units are used for controlling rotation speed, torque assist, and positioning of fans, pumps, compressors, conveyors, elevator machines and the like.

Small, high-efficiency synchronous motors equipped with permanent magnets have been widely used for the electric motor drive units in the aforementioned industries.

To drive a synchronous motor, position information of the motor rotor's magnetic pole is necessary. Therefore, a position sensor, such as a resolver or hall integrated circuit, is required to detect the position of the magnetic pole.

Recently, however, a technology called "sensorless control" has become popular whereby the number of rotations and torque of a synchronous motor are controlled without using a position sensor.

As the result of the sensorless control, it is possible to reduce the costs of installing a position sensor (the cost of the position sensor itself and the cost of wiring of the position sensor) as well as reducing the size of the device since a position sensor is not necessary; and also the use in poor environments becomes possible. Thus, significantly advantageous effects can be obtained.

Synchronous motor's sensorless control systems that are currently being adopted include the following: a system which directly detects an induced voltage (speed electromotive voltage) generated by the rotation of a rotor, uses the voltage as the rotor's position information, and drives the synchronous motor; and a position estimation system which performs estimated calculation of the rotor position based on the mathematical model of the targeted motor.

The sensorless control creates significantly advantageous effects in that the costs to install a position sensor can be reduced, the size of the device can also be reduced due to an unnecessary position sensor, and the use in poor environments is made possible. However, there is a problem with the sensorless control in its position detection method executed during a low-speed driving process.

Specifically, since most of the currently and practically applied sensorless controls are based on the induced voltage (speed electromotive voltage) generated by a synchronous motor, sensitivity to the detection of an induced voltage decreases in the zero-speed vicinity (halting state) and the low-speed zone where an induced voltage is small. Consequently, there is a problem in that position information is drowned out by noise.

To address such a problem, for example, Japanese Patent Laid-Open No. 2009-189176 (patent literature (PTL) 1) proposes a sensorless control system in the low-speed zone based on the 120-degree energization control of synchronous motors. Thus, synchronous motors can also be controlled in the low-speed zone where the induced voltage is small.

Furthermore, sensorless control systems based on the induced voltage (speed electromotive voltage) generated by a synchronous motor include the following: a system based on the zero crossing of the induced voltage as described in Japanese Patent Laid-Open No. Hei 11(1999)-341869 (PTL 2), and a system described in Japanese Patent Laid-Open No. Hei 7(1995)-123773 (PTL 3) wherein a value of the induced voltage is directly read by an AD converter and the rotor position is estimated according to the rate of change.

CITATION LIST

Patent Literature

PTL 1 Japanese Patent Laid-Open No. 2009-189176
PTL 2 Japanese Patent Laid-Open No. Hei 11(1999)-341869
PTL 3 Japanese Patent Laid-Open No. Hei 7(1995)-123773

SUMMARY OF INVENTION

Technical Problem

The system described in PTL 1 can obtain good control performance while a motor is stopped or in the low-speed state. However, nothing is mentioned about a specific method for controlling the rotor position angle or rotation speed.

PTL 2 and PTL 3 describe technologies related to the timing of energized-phase switching of a synchronous motor that is driven with 120-degree energization, but PTL 2 and PTL 3 do not relate to the systems for controlling the rotation speed or rotor position.

For example, the system for obtaining speed information without a speed sensor is designed such that intervals between the timing at which the energized phase is switched are measured by a counter, and the time per rotation of a rotor is counted backward based on the obtained value. Thus, speed information can be obtained.

Accordingly, speed detection tends to be delayed as the rotation speed decreases, which results in a possibility in that speed accuracy cannot be increased and speed control response cannot be set high.

An objective of the present invention is to provide a synchronous motor drive system by means of a sensorless control which does not use a position sensor, wherein stable position control and speed control can be achieved at least in the zero-speed vicinity through the low-speed zone.

Solution to Problem

The present invention is characterized by utilizing the phenomenon in which when two phases of the three-phase stator windings of a synchronous motor are sequentially selected and energized at 120°, an electromotive voltage of the de-energized phase changes according to the rotor position. The present invention is also characterized in that rotor position information is instantaneously obtained according to the electromotive voltage of the de-energized phase; and rotor speed information is also obtained according to the rate of change of the obtained position information.

More preferably, an electromotive voltage of the de-energized phase is related beforehand to the synchronous motor rotor position, and related rotor position information is obtained from the detected electromotive voltage, thereby rotor position information is instantaneously obtained.

Advantageous Effects of Invention

According to the present invention, because position information or speed information can be obtained as an instantaneous value in the zero-speed vicinity through the low-speed zone, it is possible to achieve a system for stably controlling the position or the speed at least in the zero-speed vicinity through the low-speed zone.

DESCRIPTION OF EMBODIMENTS

Hereinafter, configuration and operation of a synchronous motor drive system in accordance with each embodiment of the present invention will be described with reference to FIGS. 1 through 30.

EXAMPLE 1

First, the entire configuration of a synchronous motor drive system in accordance with a first embodiment of the present invention will be described with reference to FIG. 1.

Figure 1:
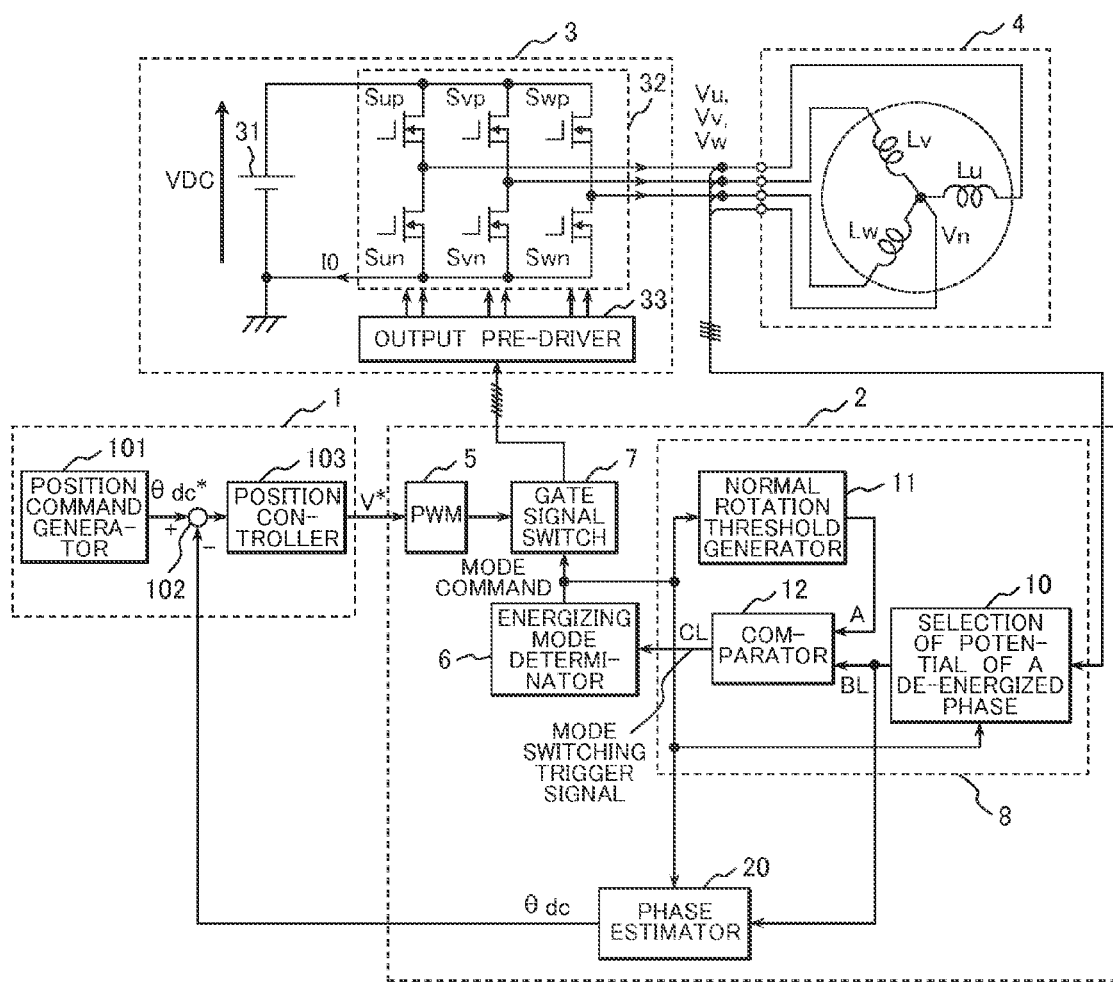
FIG. 1 is a block diagram of a synchronous motor system in accordance with an example of the present invention.

FIG. 1 shows the configuration of a drive system for driving a synchronous motor 4. The drive system comprises an applied voltage command generator 1A for calculating the applied voltage command V* to the synchronous motor 4 so that the rotor position of the synchronous motor is located at the desired angle, a controller 2A for calculating a voltage applied to the synchronous motor and creating a pulse-width modulation wave (PWM) signal to an inverter, an inverter 3 for generating an alternating-current voltage from a direct-current power source in response to the PWM signal sent by the controller 2, and a synchronous motor 4 that is equipped with three-phase stator windings and is controlled by the above components.

The inverter 3 comprises a direct-current power source 31 for supplying electric power to the inverter, the inverter's main circuit 32 comprised of six switching elements Sup to Swn, and an output pre-driver 33 for driving the inverter's main circuit 32.

The applied voltage command generator 1A, which generates the applied voltage command V* to the synchronous motor, is a superior-ranking controller of the controller 2A. Different superior-ranking controllers can be used according to usage. For example, a current controller is used for controlling current of the synchronous motor 4, and a speed controller is used for controlling rotation speed. In this example, or Example 1, the superior-ranking controller serves as a position controller for the purpose of controlling the rotor phase (rotor position). In any event, a voltage created according to the applied voltage command V* is finally pulse-width modulated and applied to the synchronous motor 4.

Inner components of the applied voltage command generator 1A include a position command generator 101 for generating a command θdc* for the rotor position of the synchronous motor 4, a subtracter 102 for calculating the deviation from the position estimate value θdc from the controller 2A, and a position controller 103 for performing the correction calculation of the voltage applied to the synchronous motor 4 so that the deviation becomes zero.

The controller 2A incorporates a PWM generator 5 that creates pulse-width modulated PWM waves according to the output from the position controller 1.

The energizing mode determinator 6 sequentially outputs mode commands that determine six different switching modes of the inverter's main circuit.

The gate signal switch 7 determines how the switching elements Sup to Swn of the inverter's main circuit 32 perform switching according to the mode command and finally outputs six gate pulse signals to the inverter 3.

The energizing mode determinator 6 sequentially switches energizing modes according to the signal generated by the mode switching trigger generator 8.

The mode switching trigger generator 8 comprises a de-energized phase selector 10 for selecting a de-energized phase of the three-phase windings according to the mode command and sampling a voltage of the de-energized phase Vu, Vv, or Vw of the synchronous motor, a normal rotation threshold generator 11 for generating a voltage that is a threshold in the direction of normal rotation with regard to the voltage of the de-energized phase of the synchronous motor, and a comparator 12 for comparing the voltage of the de-energized phase with the normal rotation threshold and generating a mode switching trigger signal in the direction of normal rotation.

The phase (rotor position) estimator 20, which is a characteristic component of the present invention, performs estimated calculation of the rotor position (angle) θd of the synchronous motor 4 based on the detected potential BL that is a voltage of the de-energized phase that corresponds to the mode determined by the energizing mode determinator 6.

The subtracter 102 calculates the position signal θdc that corresponds to the estimated rotor position (angle) θd so that the position signal θdc matches the position command θdc* outputted by the position command generator 101 incorporated in the applied voltage command generator 1A. Based on the calculated value, the position controller 103 corrects the applied voltage command V*.

Next, the basic operation of the present invention will be described.

The 120-degree energization method, which is a principal method of the present invention, selects two windings of the three-phase windings of the synchronous motor and applies voltage to the selected windings, thereby generating rotor torque. Six different combinations of two windings are available, and those combinations are defined as energizing modes 1 to 6. Herein, as already known, three windings are defined as a U-phase, a V-phase, and a W-phase.

Figure 2A:
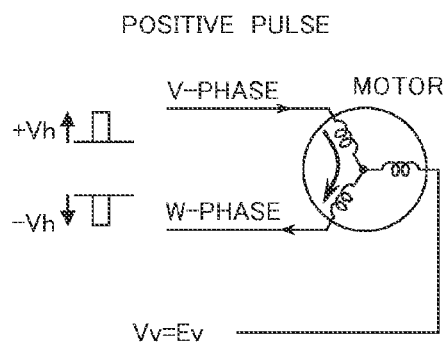
FIG. 2 is an explanatory drawing showing the situation where a pulse voltage is applied to two phases.
Figure 2B:
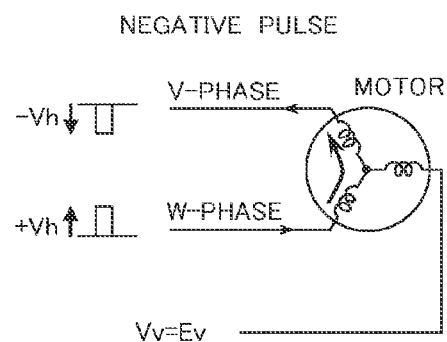

FIG. 2A shows a mode in which current is applied from the V-phase to the W-phase (this mode corresponds to mode 3 as described later), while FIG. 2B shows a mode in which current is applied from the W-phase to the V-phase.

Figure 3:
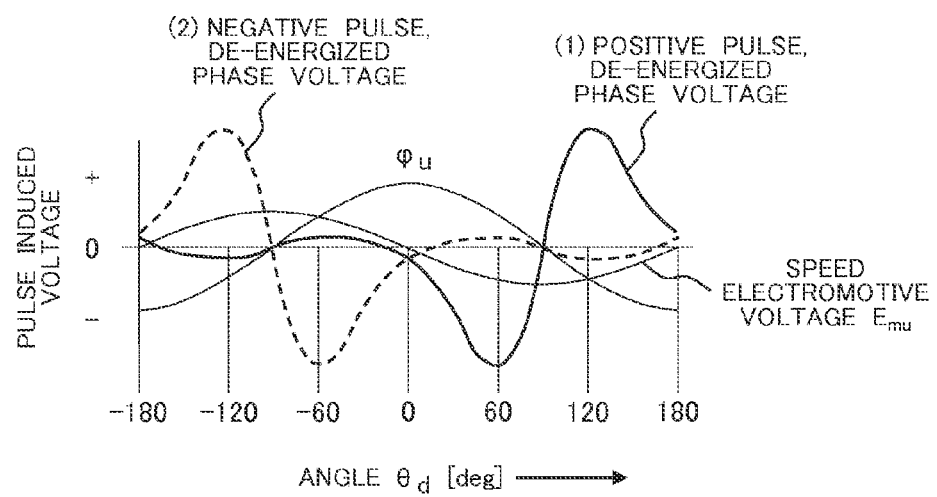
FIG. 3 is an explanatory drawing of the induced voltage of the de-energized phase when a pulse voltage is applied as shown in FIG. 2.

On the other hand, an electromotive voltage generated in the U-phase, which is a de-energized phase that occurs when a rotor position angle is changed by one period of electrical angle, is as shown in FIG. 3. FIG. 3 indicates that the electromotive voltage of the U-phase changes according to the rotor position.

The above electromotive voltage is not a speed electromotive voltage, but is the difference in the change rate of magnetic flux generated in the V-phase and the W-phase that has been observed as a voltage of the U-phase, which is a de-energized phase. Therefore, this electromotive voltage is called a "magnetic saturation electromotive voltage" so as to be distinguished from the speed electromotive voltage.

FIG. 3 indicates that both the voltage of the de-energized phase at the time of the positive pulse application indicated by a solid line and the magnetic saturation electromotive voltage of the de-energized phase at the time of the negative pulse application indicated by a broken line are larger than the speed electromotive voltage Emu.

Therefore, by detecting a magnetic saturation electromotive voltage of the de-energized phase instead of detecting the speed electromotive voltage, comparatively large rotor position signals can be obtained when the rotation of the synchronous motor is in the zero-speed vicinity through the low speed zone.

Figure 4:
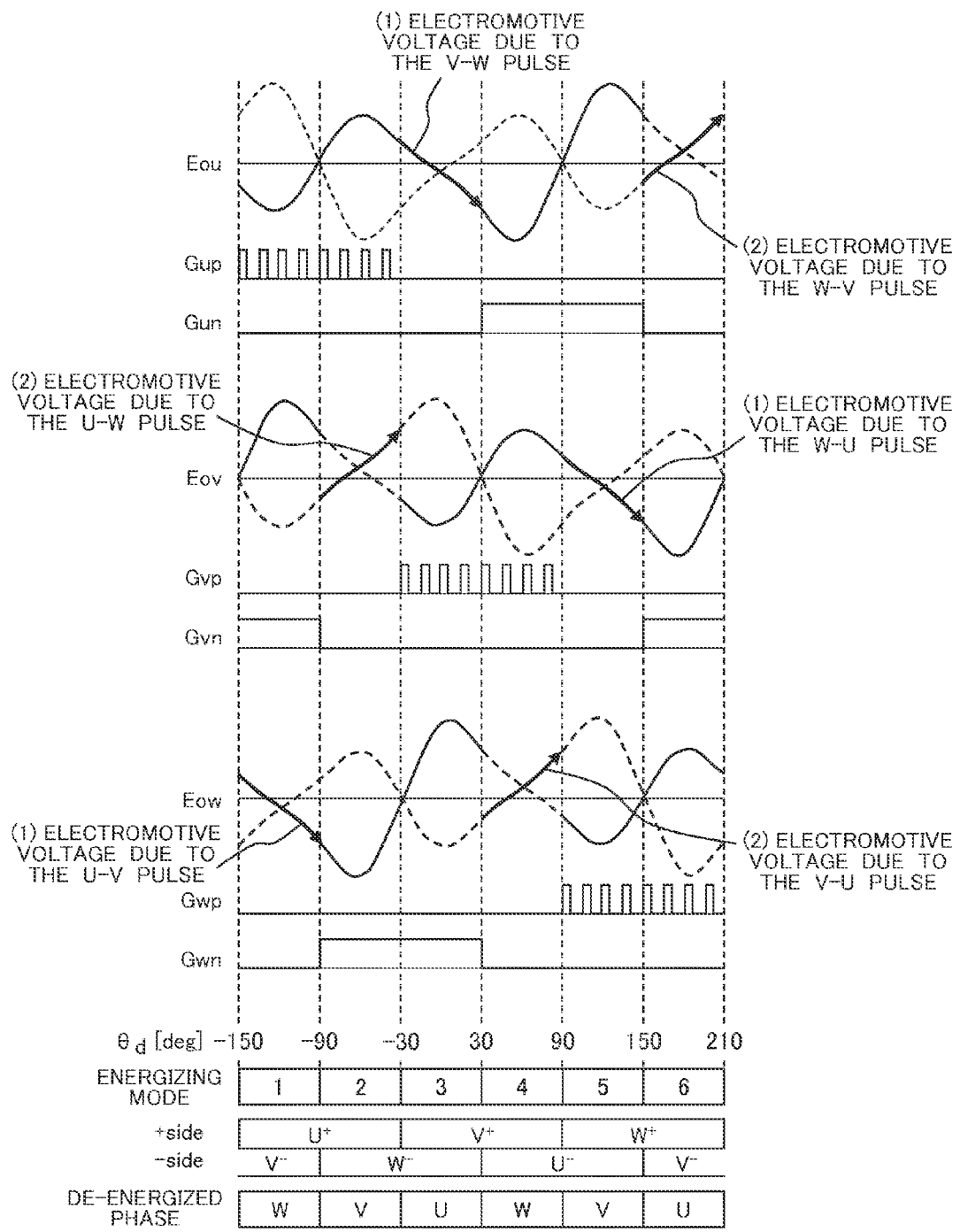
FIG. 4 is an explanatory drawing of a magnetic saturation electromotive voltage generated during the normal pulse-width modulation (PWM).

FIG. 4 shows magnetic saturation electromotive voltages of the U-phase, V-phase, and W-phase, gate signals Gup to Gwn of the switching elements Sup to Swn constituting the inverter 3, the rotation phase angle θd of the synchronous motor, and energizing modes.

The voltage pulses shown in FIGS. 2A and 2B are applied during the normal 120-degree energizing operation, and two energized phases are switched every 60° according to the phase angle θd. This means that the de-energized phase is also sequentially switched.

In FIG. 4, modes 3 and 6 are equivalent to the states shown in FIGS. 2A and 2B, respectively; and since at this time the U-phase is a de-energized phase, the magnetic saturation electromotive voltage occurs at a location shown by the thick arrow. That is, the observed magnetic saturation electromotive voltage decreases in the minus direction in mode 3 and increases in the plus direction in mode 6.

As can be expected, because the de-energized phase is switched, when the V-phase is a de-energized phase, the magnetic saturation electromotive voltage occurs at a location shown by the thick arrow in modes 2 and 5, where the observed magnetic saturation electromotive voltage increases in the plus direction in mode 2, and decreases in the minus direction in mode 5.

Similarly, when the W-phase is a de-energized phase, the magnetic saturation electromotive voltage occurs at a location shown by the thick arrow in modes 1 and 4, where the observed magnetic saturation electromotive voltage decreases in the minus direction in mode 1 and increases in the plus direction in mode 4.

Figure 5:
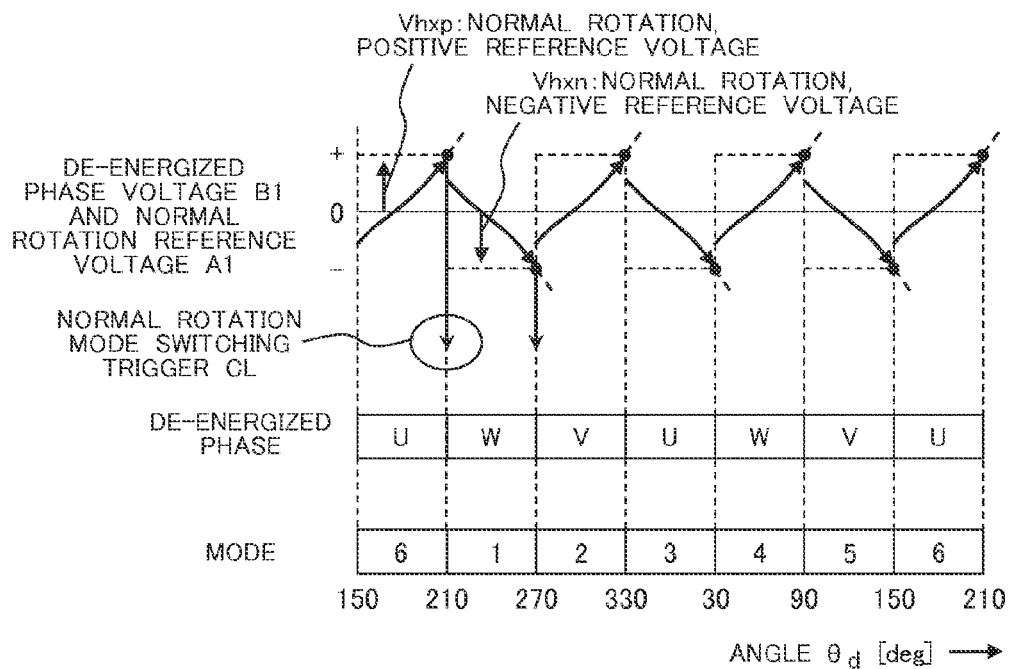
FIG. 5 is an explanatory drawing of a relationship between the voltage of the de-energized phase and the normal rotation threshold.

FIG. 5 shows a relationship among the energizing mode, de-energized phase, and the magnetic saturation electromotive voltage of the de-energized phase. The graph illustrates that the magnetic saturation electromotive voltage increases in the plus direction and decreases in the minus direction every time energizing modes are switched.

Therefore, by setting the threshold voltages (Vhxp, Vhxn) on the positive side and the negative side, respectively, it is possible to generate a mode switching trigger signal based on the relationship between the threshold voltage and the magnetic saturation electromotive voltage.

The above operations have been successfully conducted by the mode switching trigger generator 8. A de-energized phase potential selector 10 selects a de-energized phase according to a mode and detects the potential BL (magnetic saturation electromotive voltage) of that phase.

Furthermore, a normal rotation threshold generator 11, which generates a threshold voltage in the direction of normal rotation, also generates a normal rotation, positive reference voltage Vhxp and a normal rotation, negative reference voltage Vhxn.

Subsequently, the potential BL of the de-energized phase, the normal rotation, positive reference voltage Vhxp, and the normal rotation, negative reference voltage Vhxn are entered into a comparator 12 as threshold values, and the values are compared. At the time the potential BL of the de-energized phase has reached its threshold, the mode switching trigger signal CL is generated, and an energizing mode is advanced in the direction of normal rotation.

The above are the basic operations for generating torque in the zero-speed vicinity.

Next, operation of the phase (rotor position) estimator 20, which is a characteristic component of the present invention, will be described. A relationship between the magnetic saturation electromotive voltage generated in the de-energized phase and the rotor position is as shown in FIG. 5, wherein monotonic decrease and increase in the voltage are repeated with regard to the position angle with a period of 60-degree electrical angle.

A magnetic saturation electromotive voltage is sampled at least once within a period of carrier frequency, which means that an instantaneously value is read. Actually, the voltage is sampled every time a voltage pulse is applied.

Therefore, by correlating the magnetic saturation electromotive voltage to the rotor position (angle) beforehand, it is possible to obtain the rotor position (angle) from the detected voltage.

To do so, for example, the rotor position (angle) correlated to the magnetic saturation electromotive voltage may be stored in a data table comprised of semiconductor memory. Accordingly, it is possible to quickly detect the rotor position (angle) by reading out the rotor position (angle) that corresponds to a magnetic saturation electromotive voltage according to the sampling of the magnetic saturation electromotive voltage.

Figure 6A:
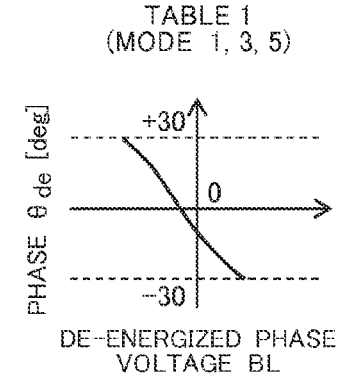
FIG. 6 is an explanatory drawing of a relationship between the voltage of the de-energized phase and the rotor phase θd.
Figure 6B:
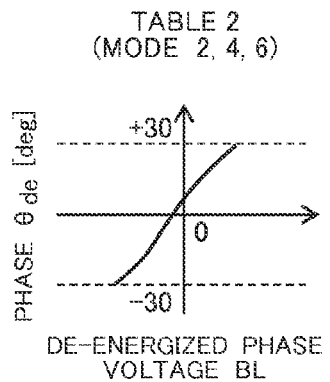

A relationship between the magnetic saturation electromotive voltage and the rotor position (angle) is shown in FIG. 6. FIG. 6A shows the relationship in mode 1, mode 3, and mode 5; and FIG. 6B shows the relationship in mode 2, mode 4, and mode 6. Because the data table discretely deals with data, a relationship may be obtained between the magnetic saturation electromotive voltage and the rotor position (angle) that have been divided into portions necessary for controlling an electric motor.

Since the de-energized phase is switched at an angle of 60° from +30° to −30°, for example, if a table is divided according to one degree, sixty "squares" may be prepared. In addition, with regard to the voltage between the "squares," the rotor position (angle) may be obtained by an interpolation calculation.

Herein, the phase (rotor position) estimator 20 is equipped with the data table 1 for mode 1, mode 3, and mode 5 and the data table 2 for mode 2, mode 4, and mode 6.

Figure 7:
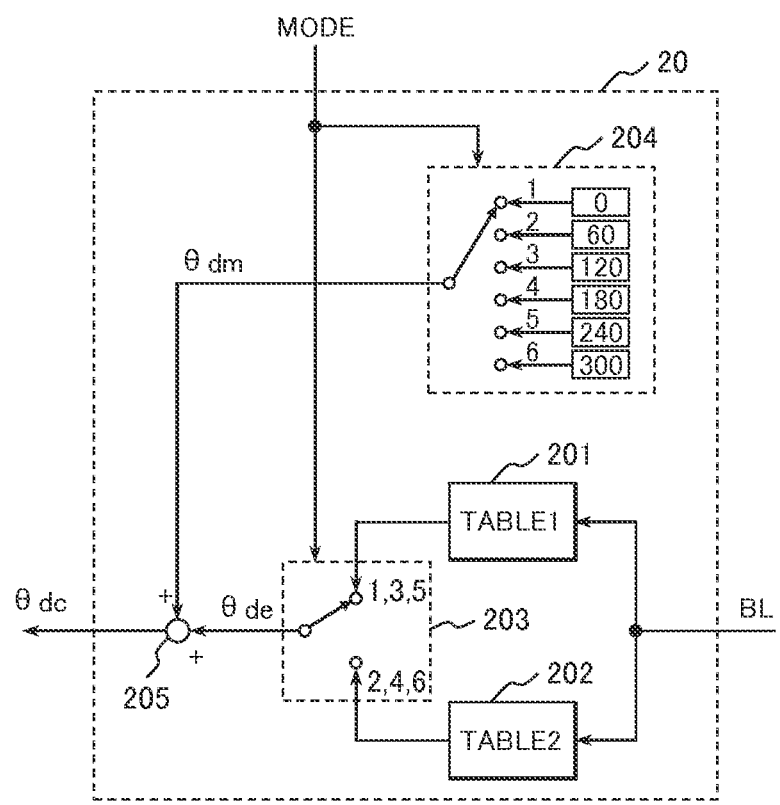
FIG. 7 is a block diagram of a phase estimator shown in FIG. 1.

FIG. 7 shows the configuration of the phase (rotor position) estimator 20. The data table 201 is used when the energizing mode is mode 1, 3, or 5, while the data table 202 is used when the energizing mode is mode 2, 4, or 6.

The data tables are switched by means of a switch 203, which is designed so as to select the data table 1 for mode 1, 3, and 5 and select the data table 2 for mode 2, 4, and 6 according to the mode signal determined by the energizing mode determinator 6.

Since the de-energized phase is switched at an angle of 60°, the phase (rotor position) θde outputted from the data table is also within a range ±30° of electrical angle as shown in FIG. 6.

Therefore, one period of position information θdc of a rotor can be obtained by adding a reference phase θdm of each mode by means of an adder 205.

Although a reference phase θdm of each mode is outputted by the reference phase generator 204, switches are switched also in the reference phase generator 204 according to a mode signal determined by the energizing mode determinator 6. In such cases, six reference phases θdm (0°, 60°, 120°, 180°, 240°, and 300°) are outputted according to modes 1 through 6.

By means of the above operations, it is possible to calculate the rotor phase (rotor position) based on the instantaneous magnetic saturation voltage value.

As a result, it is possible to obtain rotor position information without providing a position sensor to detect the rotor position and the speed of the synchronous motor 4; and therefore, a rotor position control system can be achieved. The position control system can be applied to, for example, a valve position angle control or a simple positioning control.

Herein, a relationship between an electromotive voltage and a rotor phase is expressed by use of a data table; however, calculations may be conducted according to an approximate function such as a linear function or a quadratic function. In such cases, calculation is prolonged when compared with a method that looks up data in a table. However, calculation time is not considered critical since rotation is within a low speed zone.

Furthermore, the connection point potential (neutral point potential) of the three-phase windings of a synchronous motor 4 is detected in FIG. 1. However, it is not necessary to connect the neutral point potential because a potential of the de-energized phase can be basically detected wherever potential is referred to. Conversely, it is also possible to obtain a magnetic saturation electromotive voltage because magnetic saturation has an effect on the neutral point potential even if the neutral point potential is observed without detecting a de-energized phase.

In such a case, the de-energized phase potential selector 10 is unnecessary, but the neutral point potential must be connected for detection. This can also be applied to the following embodiments.

EXAMPLE 2

Next, a synchronous motor speed control system in accordance with a second embodiment of the present invention will be described with reference to FIGS. 8 and 9.

In general, speed control systems based on the 120-degree energization method measure the energizing mode switching period (a period of every 60° of electrical angle) by means of such a device as a counter and calculate the reciprocal of the measured value in order to obtain speed information.

Therefore, when the number of rotations is small, measurement takes long period of time, which takes long time to obtain speed information, causing a control response to significantly become low. Specifically, when speed is controlled without a sensor, such detection delay is critical, which makes it difficult to achieve a quick response.

To achieve a quick and accurate speed control, undesirably, a rotation speed sensor must be separately attached to the electrical motor.

The second embodiment of the present invention described below proposes a technology to solve the above problem.

Figure 8:
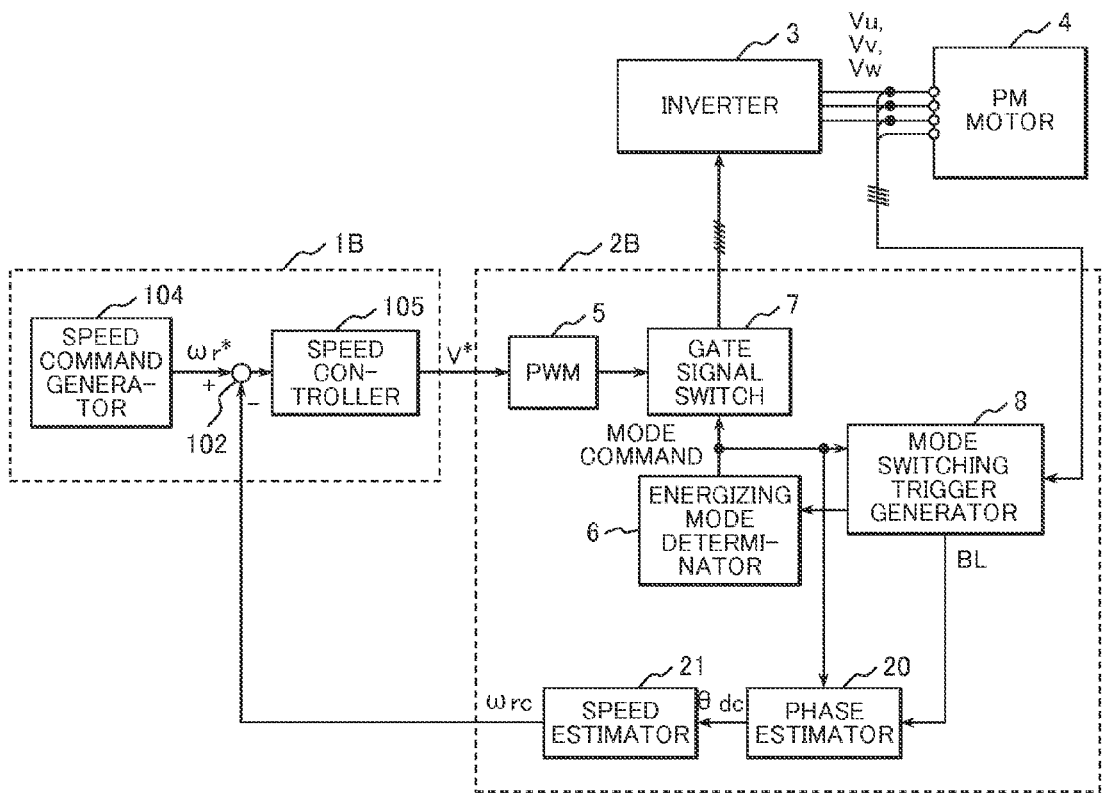
FIG. 8 is a block diagram of a synchronous motor system in accordance with another example of the present invention.

An embodiment shown in FIG. 8 is different from an embodiment shown in FIG. 1 in two points: One point is that an applied voltage command generator 1B functions as a rotation speed controller 1B of the synchronous motor 4, and the other point is that a speed estimator 21 is newly added.

The speed estimator 21 performs estimated calculation of the rotation speed ωrc of the synchronous motor by using the output θdc from the position estimator 20 described in the first embodiment, Example 1.

Then, the applied voltage command generator 1B performs control so that the estimate value ωrc obtained by the speed estimator 21 matches the rotation speed command ωr*.

The applied voltage command generator 1B comprises a speed command generator 104 for outputting the rotation speed command ωr* for a synchronous motor 4, a subtracter 102 for calculating the deviation between the rotation speed command ωr* and the speed estimate value ωrc, and a speed controller 105 for calculating the applied voltage command V* to the synchronous motor 4 so that the deviation between the rotation speed command ωr* and the speed estimate value ωrc becomes zero. The applied voltage command V* is sent to a controller 2B for calculating a voltage applied to the synchronous motor and creating a pulse-width modulation wave (PWM) signal to an inverter, thereby pulse-width modulated PWM waves are created according to the output from the rotation speed controller 1B.

Next, operation of a speed controller 21 will be described with reference to FIG. 9. The way to derive the speed from the rotor phase θdc obtained by means of the position estimator 20 is to calculate a change rate of the rotor phase θdc. Therefore, differential calculus is basically sufficient; however, to obtain speed more accurately, this embodiment adopts a PLL speed estimator 21.

The speed estimator 21 comprises a subtracter 210, a PI controller 211, and an integrator 212. The PLL speed estimator 21 internally calculates the phase (rotor position) θdc2 as a state quantity different from the phase (rotor position) θdc obtained by the position estimator 20. The phase (rotor position) θdc2 is an independent estimate value of the rotor phase (rotor position), and the PI controller 211 operates so that the phase (rotor position) matches the phase (rotor position) θdc obtained by the position estimator 20. Herein, since θdc2 is an output from the integrator, a physical quantity to be entered is rotation speed.

Thus, when the phase (rotor position) θdc matches the phase (rotor position) θdc2, an output from the PI controller 211, which is an intermediate variable, accurately matches rotation speed information. Accordingly, it is possible to estimate the rotor speed ωr by use of an output from the PI controller 211.

Since in this example, a PLL speed estimator 21 is used, advantageous effects can be expected in that calculation errors and adverse effects of noise are less when compared with a speed calculation by means of differential calculus.

The applied voltage command controller 1B corrects the value of the applied voltage command so that the obtained rotation speed estimate value ωrc matches the speed command ωr*, and outputs the value to the synchronous motor 4.

In this second embodiment, when estimating the rotation speed of a synchronous motor, speed information can be obtained in each time based on the phase (rotor position) obtained according to an instantaneously detected magnetic saturation electromotive voltage of an de-energized phase without measuring the mode switching intervals. As a result, it is possible to achieve a highly accurate, quick-response speed control system.

EXAMPLE 3

Next, a third embodiment of the present invention will be described with reference to FIGS. 10 through 13.

Principally, the 120-degree energization method of the present invention observes an electromotive voltage (electromotive voltage resulting from magnetic saturation) generated in a de-energized phase of the windings that is determined according to the rotor position and detects the phase (rotor position). However, as the rotation speed increases, a speed electromotive voltage in proportion to the rotation speed is also generated.

The speed electromotive voltage increases as the number of rotations increases and is generated in such a way that it is superposed with a magnetic saturation electromotive voltage. Since the magnetic saturation electromotive voltage is only several percents of the rated voltage of the electric motor, it becomes more and more buried in the speed electromotive voltage with the increase in speed, which results in the decreased detection accuracy.

To cope with the above phenomenon, a synchronous motor speed control system in accordance with the third embodiment described below detects the phase (rotor position) at least either based on a magnetic saturation electromotive voltage or based on a speed electromotive voltage proportional to the rotation speed, according to the rotation speed of the electric motor.

Figure 10:
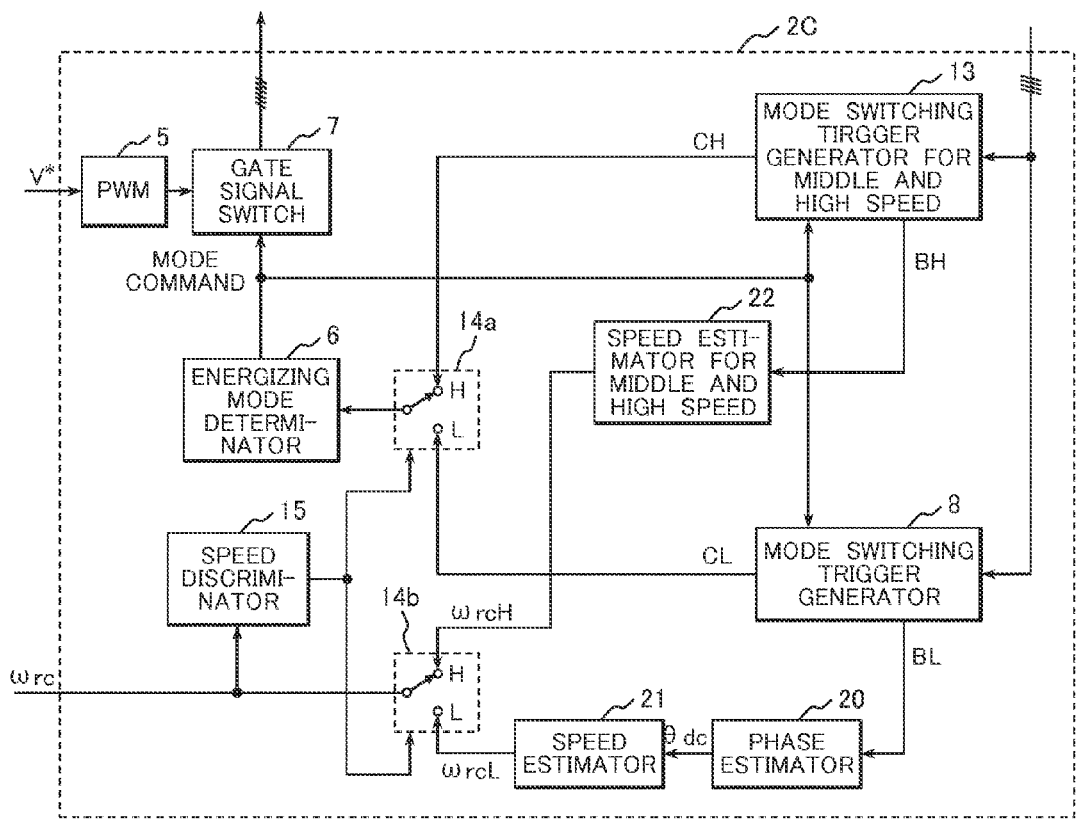
FIG. 10 is a block diagram of a synchronous motor system in accordance with another example of the present invention.

FIG. 10 is a block diagram of a controller 2C of a synchronous motor speed control system in accordance with a third embodiment of the present invention. The use of the controller 2C instead of using a controller 2B shown in FIG. 8 can achieve the third embodiment. In FIG. 10, functional parts, such as a mode switching trigger generator for middle and high speed 13, a switch 14a, a switch 14b, and a speed estimator for middle and high speed 22, are newly added, and other functional parts are the same as those described in the aforementioned examples.

In FIG. 10, a mode switching trigger generator for middle and high speed 13 is newly added as a signal source for switching energizing modes. The mode switching trigger generator for middle and high speed 13 functions when the rotation speed of a synchronous motor is in the middle and high speed zone.

Principally, as described in PTL 2, zero crossing of an electromotive voltage according to the rotation speed of the rotor is detected, thereby energizing modes are switched.

Furthermore, the speed estimator for middle and high speed 22 performs estimated calculation of the rotation speed of the synchronous motor 4 by a method different from the method conducted by a speed estimator 21 shown in FIG. 8 to estimate rotation speed in the middle and high speed zone.

Two kinds of trigger signals are entered into an energizing mode determinator 6: the signal CL from a mode switching trigger generator 8 as described in the above examples and the signal CH from a mode switching trigger generator for middle and high speed 13. Those trigger signals CL and CH are switched by a switch 14a according to the rotation speed.

Similarly, there are two kinds of speed estimate values: the estimated speed ωrcL outputted from a speed estimator 21 and the estimated speed ωrcH outputted from a speed estimator for middle and high speed 22. Signals for the estimated speed ωrcL and the estimated speed ωrcH are also switched by a switch 14b according to the rotation speed.

Switching speed of the switch 14a and the switch 14b is determined by a speed discriminator 15, and the switch 14a and the switch 14b are switched according to the determined value.

Specifically, the speed discriminator 15 turns both the switches 14a and 14b to the L side when an estimated speed is in the low-speed zone (including the zero-speed vicinity), which means that the estimated speed is equal to or less than the predetermined speed threshold value. Then, the speed discriminator 15 turns both the switches 14a and 14b to the H side when an estimated speed is in the middle and high speed zone, which means that the estimated speed is more than the predetermined speed threshold value. Herein, the predetermined speed threshold can be arbitrarily determined according to the specifications of the electric motor; however, rough indication is 8% to 15% of a maximum speed.

Figure 11:
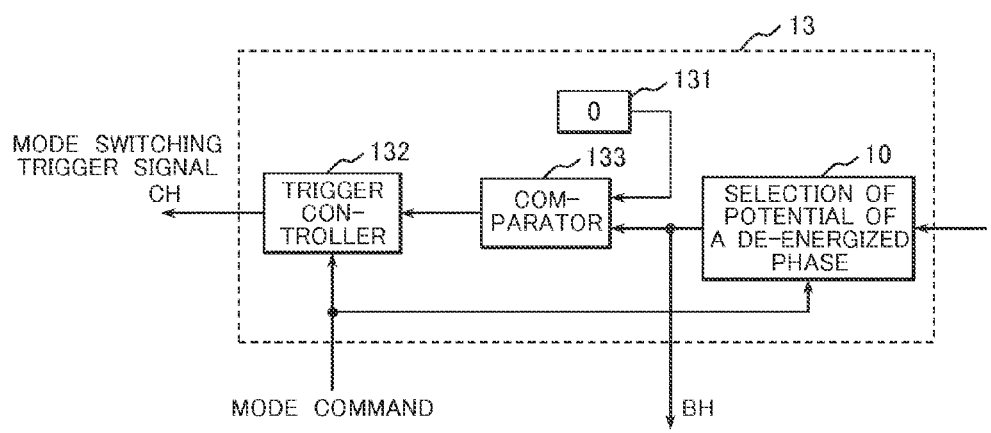
FIG. 11 is a block diagram of a mode switching trigger generator for middle and high speed shown in FIG. 10.

FIG. 11 is a block diagram of a mode switching trigger generator for middle and high speed 13 comprising a de-energized phase selector 10, a zero generator 131, a comparator 133, and a trigger controller 132.

The de-energized phase selector 10, which is the same as the de-energized phase selector 10 shown in FIG. 1, selects a voltage of a de-energized phase according to a mode command and sends the signal BH to the comparator 133. The comparator 133 compares a signal from the de-energized phase selector 10 with a reference signal (=0) from the zero generator 131 and creates a signal that is the basis for energizing mode switching. The trigger controller 132 receives a signal from the comparator 133 and creates the trigger signal CH for switching energizing modes.

Figure 12:
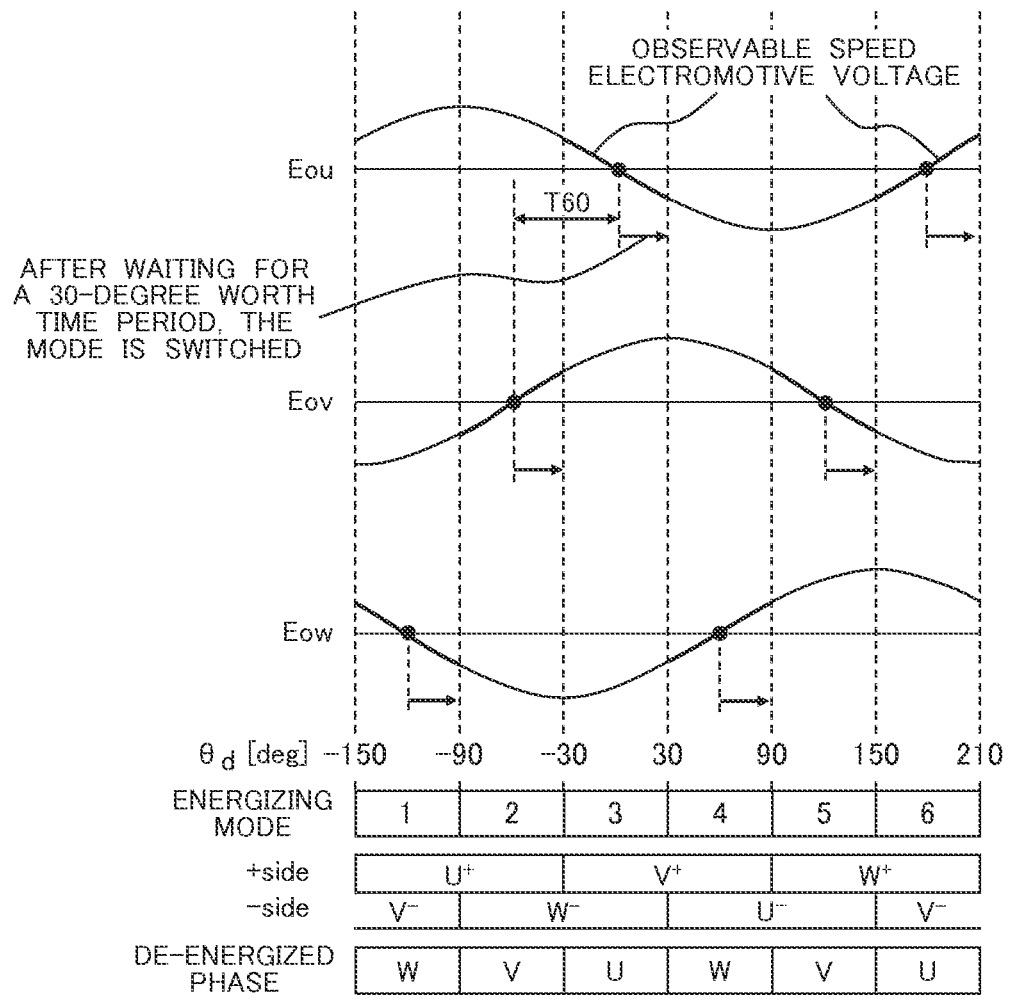
FIG. 12 is an explanatory drawing of a relationship between the waveform of the speed electromotive voltage and an energizing mode.

FIG. 12 shows a method of creating an energizing mode switching signal based on the speed electromotive voltage. Speed electromotive voltages Eou, Eov, and Eow of respective phases of the synchronous motor are generated as shown in the graph with regard to the rotor phase θd. By observing a de-energized phase, it is possible to observe a zero crossing point of the speed electromotive voltage of the de-energized phase; and based on the zero crossing point as a reference, energizing modes are controlled to switch after a time period equivalent to 30° of electrical angle has passed.

Specifically, a de-energized phase is selected by the de-energized phase potential selector 10, the zero crossing point is detected by the comparator 133, the waiting time equivalent to 30° of electrical angle is provided for the signal by the trigger controller 132, and finally the mode switching trigger signal CH is generated.

Next, operation of a speed estimator for middle and high speed 22 will be described with reference to FIG. 13.

The speed estimator for middle and high speed 22 receives the potential BH of the de-energized phase from a de-energized phase potential selector 10 shown in FIG. 11, and based on the value, performs the estimated calculation of the rotation speed of the electric motor.

Figure 13:
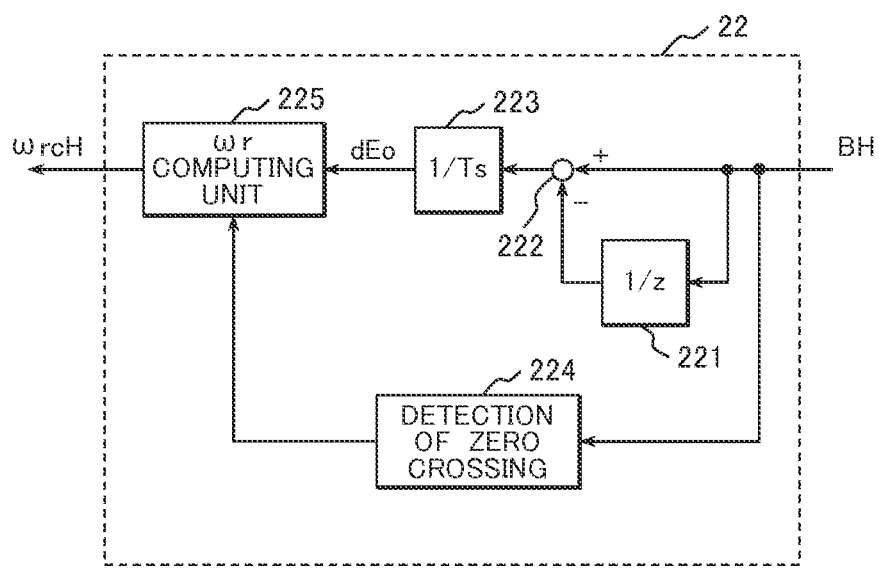
FIG. 13 is a block diagram of a speed estimator for middle and high speed shown in FIG. 10.

As shown in FIG. 13, the speed estimator for middle and high speed 22 comprises a signal delay device 221 (denoted as 1/z), a subtracter 222, a change rate calculation gain 223 (denoted as 1/Ts), a zero crossing detector 224, and a ωr computing unit 225.

Herein, the speed estimate value is obtained by calculating the rate of change in the zero crossing vicinity of the speed electromotive voltage, and this is a characteristic part of the present invention.

Hereinafter, principles of speed estimation of the speed estimator for middle and high speed 22 will be described.

Herein, let the speed electromotive voltage Eou of the U-phase be expressed by equation (1).

$$Eou = Em0 \cdot \sin(\omega r \cdot t) \quad (1)$$

where Em0 represents an amplitude [V] of a speed electromotive voltage, and ωr represents an angular speed [rad/s] (electrical angle frequency).

In Equation (1), a change rate of speed electromotive voltage dEou[V/s] is as follows:

$$dEou = (d/dt)Eou = \omega r \cdot Em0 \cdot \cos(\omega r \cdot t) \quad (2)$$

Herein, a change rate of the speed electromotive voltage in the zero crossing vicinity is ωr·t=0, or ωr·t=π, and the following can be established:

$$dEou(0) = \omega r \cdot Em0 \quad (3)$$

Also, Em0 is as follows:

$$Em0 = \omega r \cdot Ke \quad (4)$$

where ωr represents an angular speed (electrical angle frequency), and Ke represents a power generation constant of an electric motor [V/(rad/s)]. Therefore, the following can be established according to equations (3) and (4):

$$\omega r = \sqrt{[dEou(0)/Ke]} \quad (5)$$

That is, if the change rate of the speed electromotive voltage in the zero crossing vicinity is measured, it is possible to calculate the rotation speed ωr of the synchronous motor.

The speed estimator for middle and high speed 22 shown in FIG. 13 embodies the above calculations. The difference between the potential BH of the de-energized phase and an output from the signal delay device 221 that holds the previously sampled value is calculated by a subtracter 222, and the reciprocal multiple of the sampling period Ts of the value is obtained. Thus, the change rate of the voltage dEo is calculated.

For the calculation of the change rate, a difference of one sampled value is at least necessary although accuracy could be increased by taking a difference of additional several sampled values depending on the conditions. In any event, it is necessary to calculate a difference in the zero crossing vicinity.

Accordingly, in response to the zero crossing of the de-energized phase potential detected by the zero crossing detector 224, the above calculations are conducted as shown in the block diagram.

Then, according to the change rate of the speed electromotive voltage dEo, the ωr computing unit 225 performs a calculation shown in equation (5), thereby the speed estimate value ωrcH can be obtained.

Unlike conventional methods that calculate speed by measuring a mode switching period or zero crossing intervals, the speed estimation method in accordance with the third embodiment can obtain rotation speed at the moment zero crossing occurs. Accordingly, the delay factor to the speed control system can be minimized, which can stabilize the entire control system.

Thus, according to a synchronous motor speed control system in accordance with the third embodiment of the present invention, it is possible to provide a quick-response, highly-stable control system for a motor drive system in the range from the low speed through middle and high speed zone.

EXAMPLE 4

Next, a synchronous motor position control system in accordance with a fourth embodiment of the present invention will be described with reference to FIGS. 14 through 23.

As described in the third embodiment, the electromotive voltage generated in the de-energized phase includes two kinds of electromotive voltages: the magnetic saturation electromotive voltage and the speed electromotive voltage associated with the rotation of the rotor.

Coexistence of the two kinds of electromotive voltages could possibly inhibit the increase in position control accuracy. A synchronous motor position control system in accordance with the fourth embodiment proposes a technology to cope with the problem.

Figure 14:
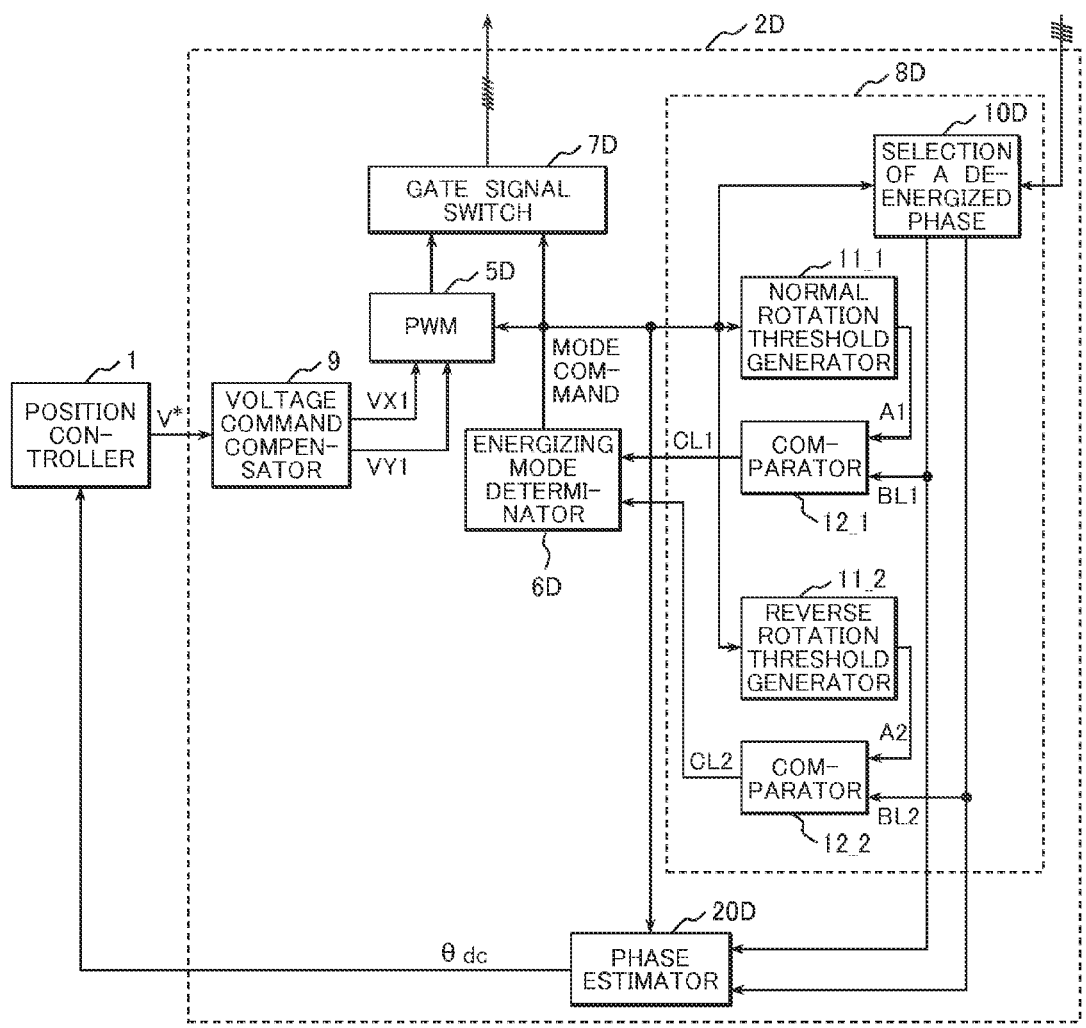
FIG. 14 is a block diagram of a synchronous motor system in accordance with another example of the present invention.

FIG. 14 shows a synchronous motor position control system in accordance with the fourth embodiment of the present invention, which uses a controller 2D shown in FIG. 14 instead of using a controller 2A in accordance with the first embodiment shown in FIG. 1.

The basic operations of the fourth embodiment are the same as those of the first embodiment shown in FIGS. 1 through 7. However, there are two different points: One point is that a voltage command compensator 9 is additionally incorporated in the controller 2D, and the other point is that the mode switching trigger generator 8D is different.

In the first embodiment, voltage is applied to two phases that correspond to their respective energizing modes, and a magnetic saturation electromotive voltage of a de-energized phase at the time of the pulse application is detected. The detected voltage is then compared with a threshold value of the normal rotation threshold generator 11, thereby a mode switching trigger signal is generated.

Correspondingly, in this embodiment, a voltage command compensator 9 is adopted, and two kinds of voltages, which are the positive pulse voltage and the negative pulse voltage, are always applied to a synchronous motor 4.

Figure 15:
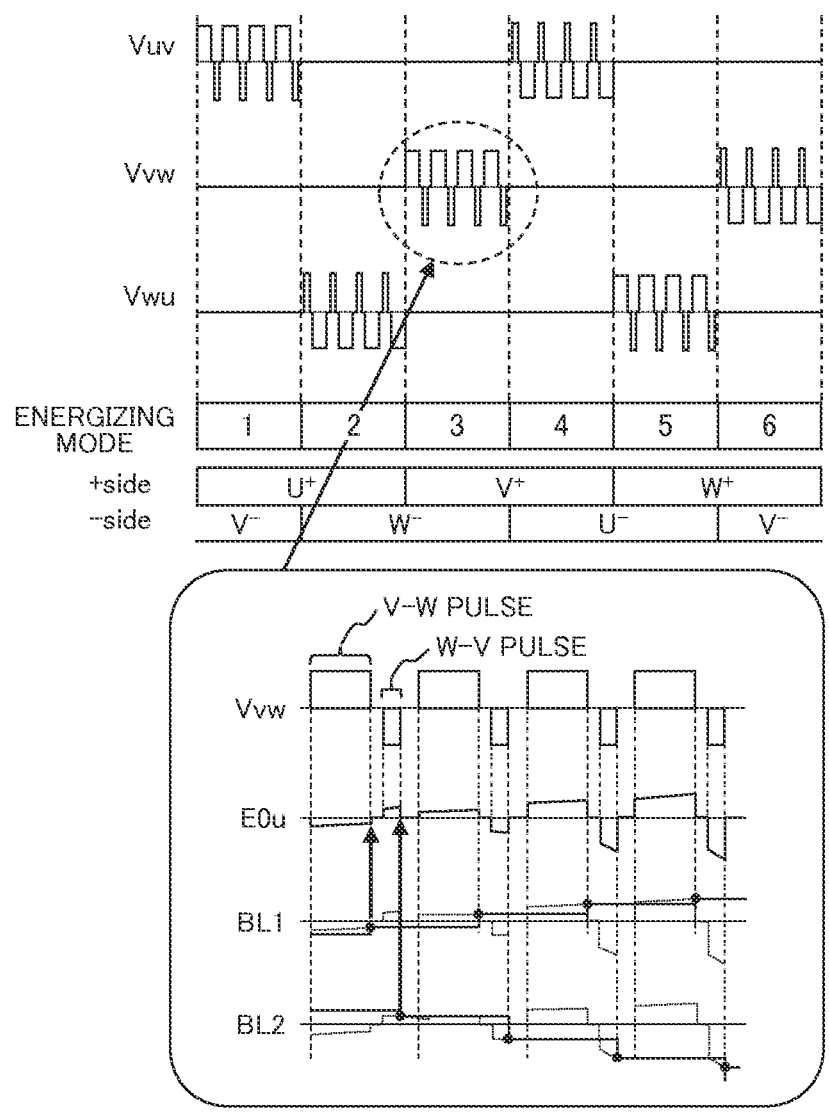
FIG. 15 is an explanatory drawing of the waveform of the line voltage between energized phases.

In this case, the waveform of a line voltage between two energized phases is characteristic as denoted as Vuv, Vvw, and Vwu shown on the upper stage of FIG. 15. The width of the positive pulse is greater than the width of the negative pulse in modes 1, 3, and 5, while the width of the negative pulse is greater than the width of the positive pulse in modes 2, 4, and 6.

An enlarged view of the waveform of the line voltage Vvw in mode 3 is located on the lower stage of FIG. 15. In mode 3, a torque in the direction of normal rotation is generated with only a positive pulse (V-W pulse), while in this embodiment, a negative pulse (W-V pulse) is intentionally outputted.

As a result, the average applied voltage is a positive voltage; however, an electromotive voltage in the direction of reverse rotation can be detected due to the negative pulse. This means that voltages in both the normal rotation direction and the reverse rotation direction can be detected at the same time in each energizing mode.

Figure 16:
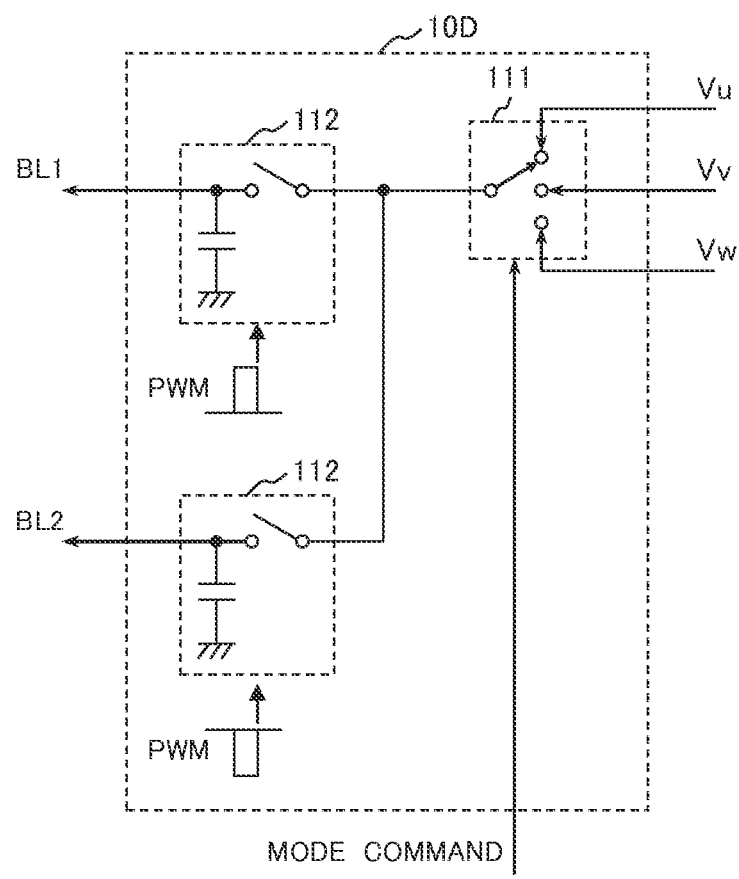
FIG. 16 is a block diagram of a de-energized phase selector shown in FIG. 14.

FIG. 16 is a block diagram of a de-energized phase selector 10D comprising a switch 111 for selecting a de-energized phase of the three-phase voltages according to the mode command, and a sample holder 112 for sample-holding a voltage of a de-energized phase, which is an electromotive voltage of a de-energized phase.

There are provided two sample holders: One samples an electromotive voltage of the de-energized phase at the time of the positive pulse voltage application, and the other samples an electromotive voltage of the de-energized phase at the time of the negative pulse voltage application. The two sample holders then output respective values as signals BL1 and BL2.

Therefore, as shown in FIG. 15, an electromotive voltage signal BL1 or BL2 of the de-energized phase is detected according to the application of a positive pulse or a negative pulse.

As shown in FIG. 14, the electromotive voltage signals BL1 and BL2 are sent to the comparators 12-1 and 12-2, respectively, and compared with a normal rotation threshold value and a reverse rotation threshold value of the normal rotation threshold generator 11-1 and the reverse rotation threshold generator 11-2, respectively. The increase or decrease of the energizing mode is then determined based on a relationship between those threshold values. A different point from the first embodiment is that the reverse rotation threshold generator 11-2 and the comparator 12-2 are additionally provided, which makes it possible to switch the energizing mode to the direction of reverse rotation.

Figure 17:
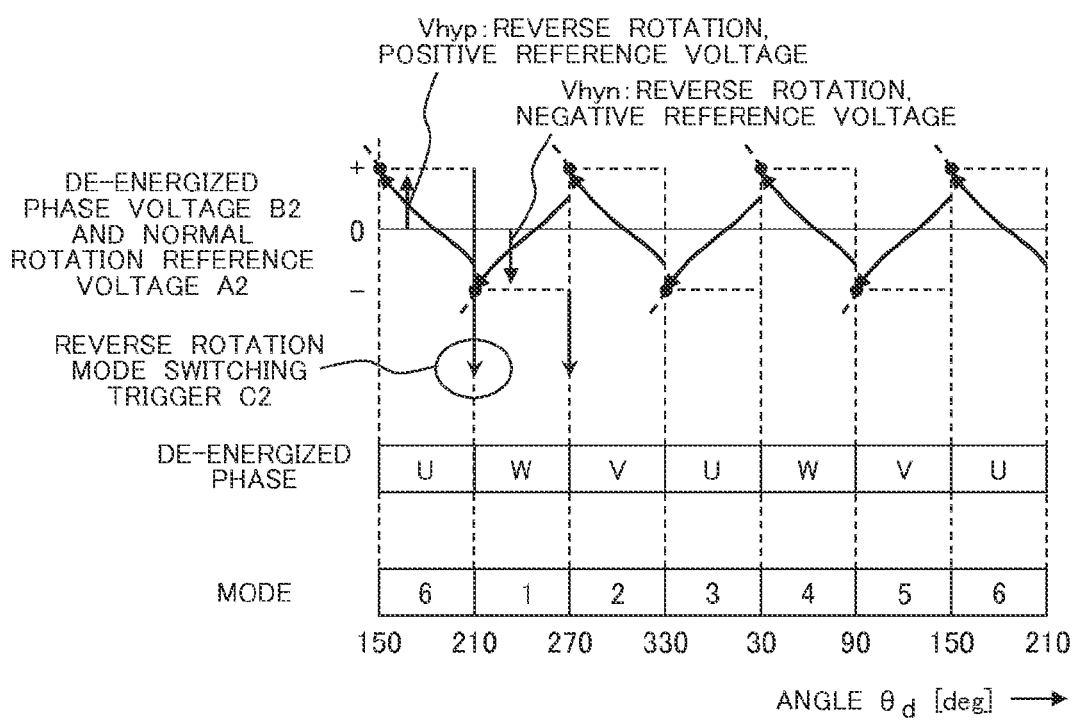
FIG. 17 is an explanatory drawing of a relationship between the voltage of the de-energized phase and the reverse rotation threshold.

FIG. 17 shows a relationship among the energizing mode, de-energized phase, and an electromotive voltage of the de-energized phase at the time of the negative pulse application. The graph indicates that when compared with the case where a positive pulse is applied as shown in FIG. 5, different magnetic saturation electromotive voltages are generated at the time of the negative pulse application, and respective voltages repeatedly increase and decrease.

Similar to the case of normal rotation, positive and negative threshold voltages (Vhyp, Vhyn) are set with regard to the reverse rotation, and based on a relationship between the threshold voltages and the magnetic saturation electromotive voltages, the trigger C2 for switching modes (direction to return mode) is generated.

Next, operations of the voltage command compensator 9 for creating the positive pulse and the negative pulse described so far, the PWM generator 5D, and the gate signal switch 7D will be described.

Figure 18A:
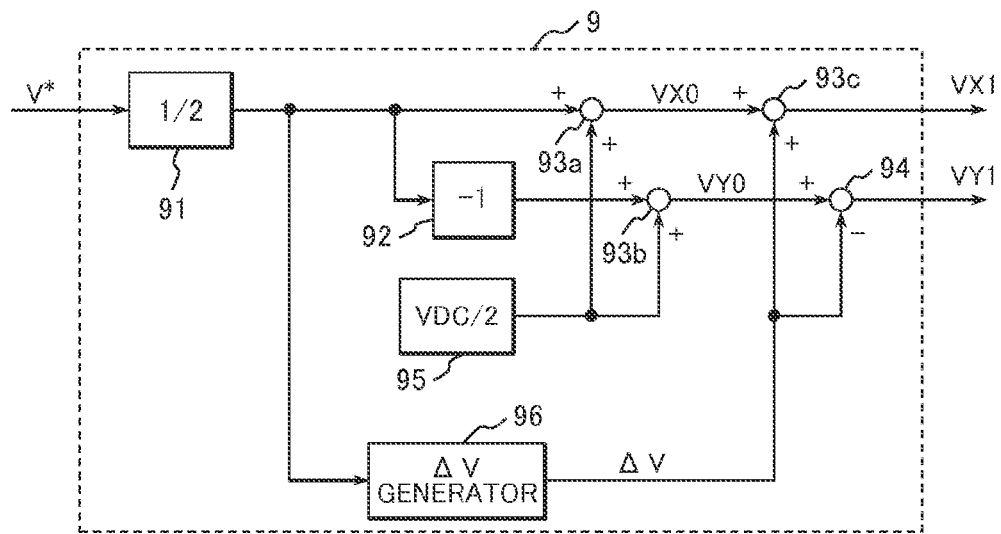
FIG. 18 is a block diagram of a voltage command compensator 9 shown in FIG. 14.

FIG. 18(a) is a block diagram of a voltage command compensator 9 comprising a gain 91 for halving an input value and outputting the halved value, a sign inverting device 92 for inverting the sign of an input value, adders 93a to 93c for adding input signals, a subtracter 94 for subtraction, and a VDC/2 generator 95 for outputting a halved value of a direct-current power source of an inverter, and a ΔV generator 96 for calculating an amount of compensation given to the voltage command.

At the time when the applied voltage command V* from the position controller A is applied to the line voltage of the energized phase, the voltage command compensator 9 compensates the command value so as to provide a negative pulse when the applied voltage command V* is positive and provide a positive pulse when the applied voltage command V* is negative. Therefore, the applied voltage command V* is first halved by the gain 91; then, VDC/2 is added to the halved value and the calculated value is represented as VX0; and the sign is inverted, VDC/2 is added to the value, and the calculated value is represented as VY0. Thus, a new command value is created.

Figure 18B:
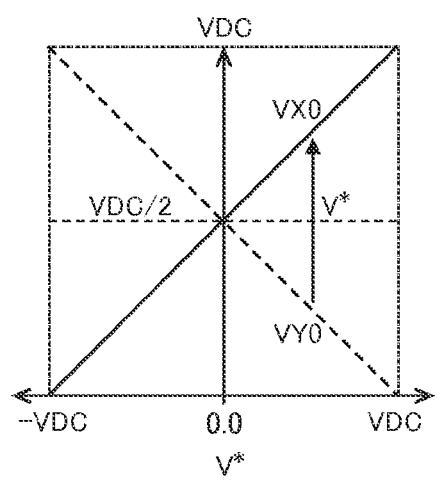

VX0 and VY0 correspond to respective phase voltage commands of two energized phases. A relationship among the applied voltage command V*, VX0, an VY0 is shown in FIG. 18(b). As the applied voltage command V* increases, VX0 also increases, but VY0 decreases. By biasing VDC/2 to both of the values, it is possible to output both positive and negative voltages.

After that, ΔV is added to VX0 by an adder 93c, ΔV is subtracted from VY0, and those calculated values are outputted as VX1 and VY1, respectively.

Next, change of the waveform due to the addition of ΔV will be described with reference to FIGS. 19 and 20.

Figure 19:
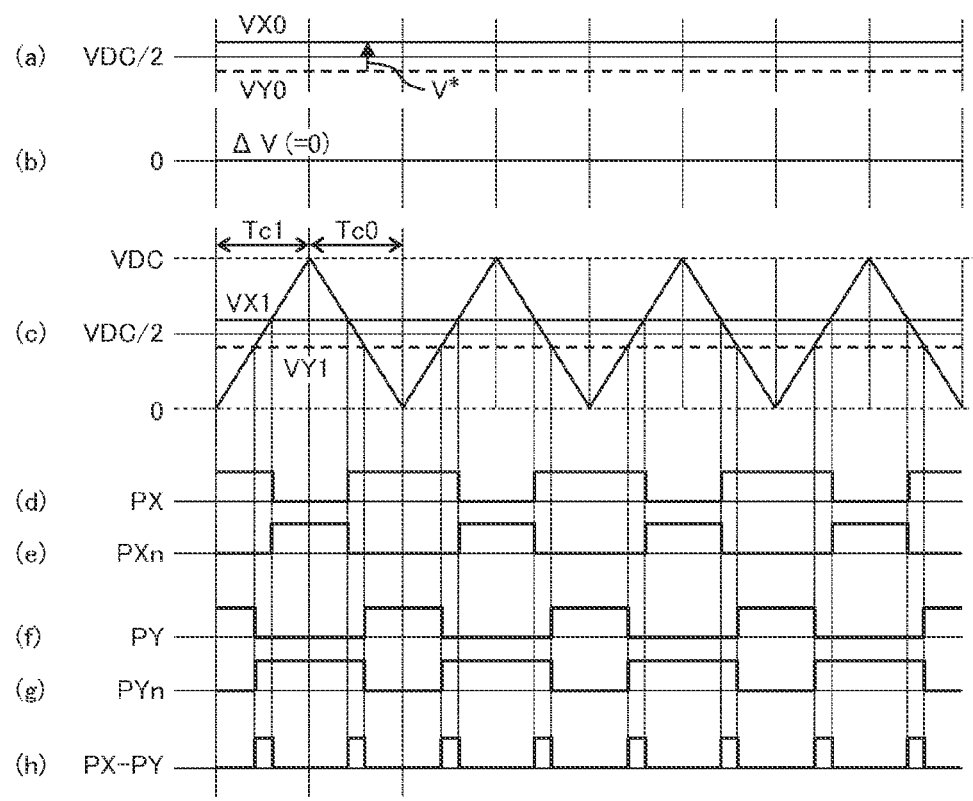
FIG. 19 is an explanatory drawing of an example of the PWM waveform ($\Delta V=0$, $V^*>0$).

FIG. 19 shows the creation of a PWM when compensation is not conducted (i.e., ΔV=0).

FIG. 19(a) shows VX0 and VY0 that are the values included in the voltage command compensator 9. Correspondingly, the waveforms VX1 and VY1 include the compensation voltage ΔV; however, because ΔV=0 as shown in FIG. 19(b), waveforms VX1 and VY1 are the same as VX0 and VY0.

PWM pulses are created based on a relationship among VX1, VY1, and the triangular wave carrier. The process is shown in FIG. 19(c) through 19(g).

The triangular wave carrier in FIG. 19(c) changes between 0 and VDC, and the rising period of the triangular wave carrier is defined as Tc1, and the falling period is defined as Tc0. The waveform PX in FIG. 19(d) is obtained from a comparison between the VX1 and the triangular wave carrier, and its inversion signal is PXn in FIG. 19(e).

Similarly, the waveform PY in FIG. 19(f) is obtained from a comparison between the VY1 and the triangular wave carrier, and its inversion signal is PYn in FIG. 19(g). In addition, the waveform that corresponds to the line voltage of the energized phases is a difference between PX and PY as shown in FIG. 19(h). This PWM system outputs a pulse string at a frequency two times the carrier frequency.

Figure 20:
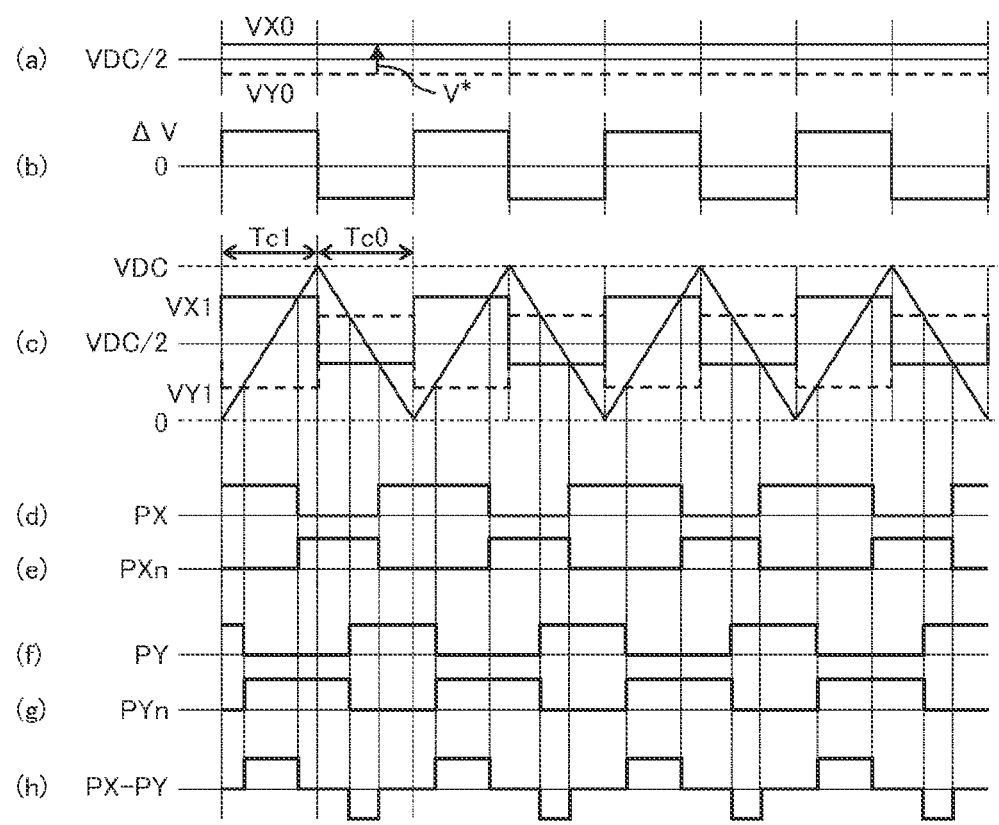
FIG. 20 is an explanatory drawing of an example of the PWM waveform ($\Delta V \neq 0$, $V^*>0$).

FIG. 20 shows the creation of a PWM when ΔV is added.

Herein, ΔV is a rectangular wave, as shown in FIG. 20(b), which synchronizes with the period of triangular wave carriers Tc1 and Tc0.

As a result, the waveforms VX1 and VY1 are as shown in FIG. 20(c). Accordingly, the waveform of the line voltage is as shown in FIG. 20(h).

Thus, it is possible to apply a positive pulse and a negative pulse to the line voltage, which is a characteristic of this embodiment. Furthermore, since an average value of the compensated voltage ΔV is zero, the average value in FIG. 20(h) matches the average value in FIG. 19(h).

Figure 21:
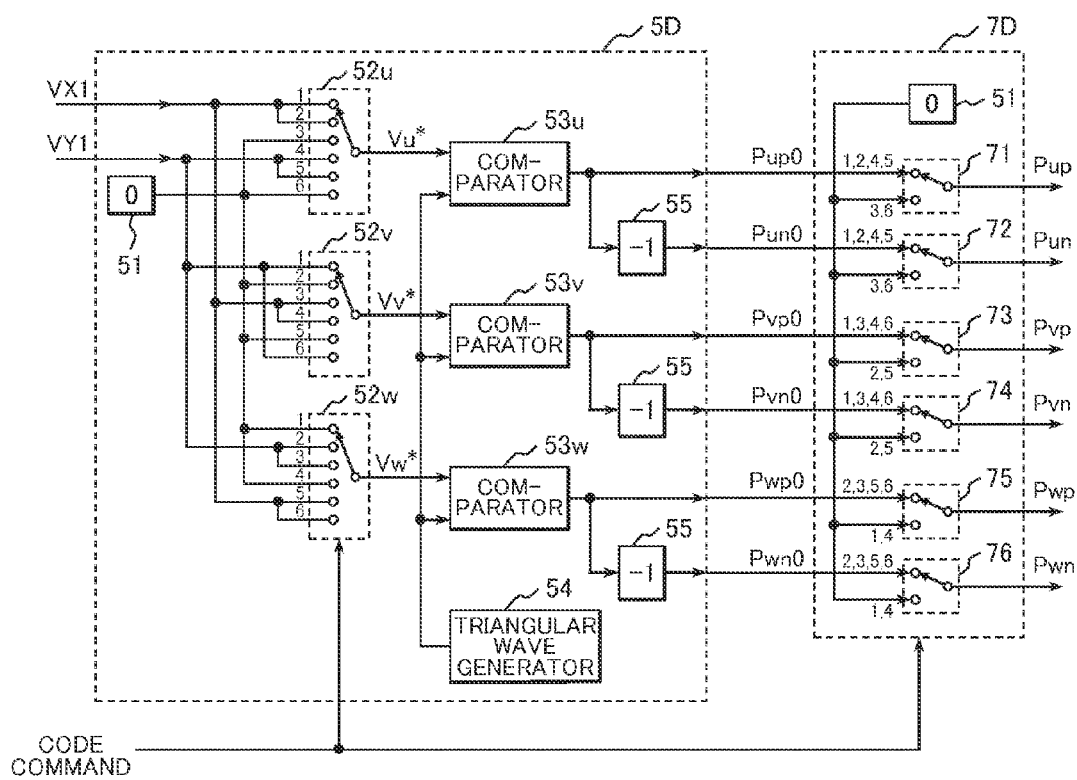
FIG. 21 is a block diagram of a three-phase PWM generator 5D and a gate signal switch 7D shown in FIG. 14.

FIG. 21 is a block diagram of a PWM generator 5D and a gate signal switch 7D. The PWM generator 5D comprises a zero generator 51 for generating zero, switches 52u to 52w for selecting the voltage command for each phase according to the mode command, comparators 53u to 53w for comparing respective voltage commands Vu* to Vw* of the three phases with the triangular wave carrier and generating pulse-width modulation signals, a triangular wave carrier generator 54 for generating a triangular wave carrier, and a sign inverting device 55 for inverting the sign of the PWM pulse. The pulse output controller 7D comprises switches 71 to 76 for switching between valid and invalid of the PWM signal according to the mode command.

Next, operations of the above devices will be described.

The compensated voltage commands VX1 and VY1 are assigned to the voltage commands of any two of the three phases. Phases are switched by switches 52u to 52w according to the energizing mode.

Furthermore, zero is given to a de-energized phase for convenience, and a signal from a zero generator 51 is assigned to the phase.

Thus, the voltage command is obtained according to each mode and compared by a comparator 53u to 53w with a triangular wave carrier which is an output from the triangular wave generator 54, and a PWM signal is created.

For example, PX or PY in FIGS. 19 and 20 is assigned to Pup0, Pvp0, and Pwp0; and PXn or PYn is assigned to Pun0, Pvn0, and Pwn0. Furthermore, Pup0, Pvp0, and Pwp0 are gate signals of the switching devices Sup, Svp, and Swp of the inverter 3, respectively; and Pun0, Pvn0, and Pwn0 operate as gate signals of the switching devices Sun, Svn, and Swn, respectively.

Operations of the upper and lower switches of the switching devices become complementary by means of the sign inverting device 55, and if nothing is done, a de-energized phase cannot be created. Therefore, switches 71 to 76 are switched to zero according to the energizing mode, thereby forcibly and simultaneously turning the upper and lower switches off. By doing so, it is possible to create a de-energized phase in the state in which the complementary function due to the comparison of the triangular wave can be maintained.

Next, a phase estimator 20D, which is the most characteristic part of the fourth embodiment, will be described with reference to FIG. 22.

Figure 22:
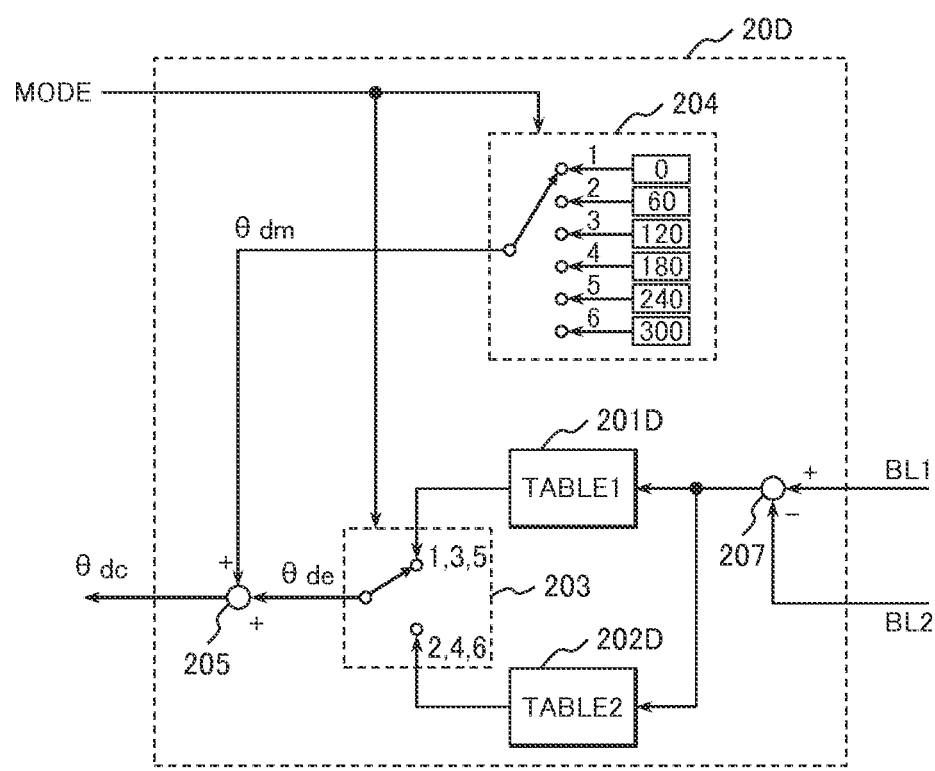
FIG. 22 is a block diagram of a phase estimator shown in FIG. 14.

In FIG. 22, a switch 203, a reference phase generator 204, and an adder 205 are the same as those devices having the same number in FIG. 7.

In this embodiment, there is newly provided a subtracter 207 for entering two magnetic saturation electromotive voltages BL1 and BL2 and calculating a difference between the two voltages. With regard to the difference between the BL1 and BL2, data tables TABLE1 and TABLE2 have prepared mapped data beforehand. Accordingly, it can be said that the phase estimator 20D calculates the rotor phase based on the difference between a magnetic saturation electromotive voltage at the time of the positive pulse application and a magnetic saturation electromotive voltage at the time of the negative pulse application.

Figure 23:
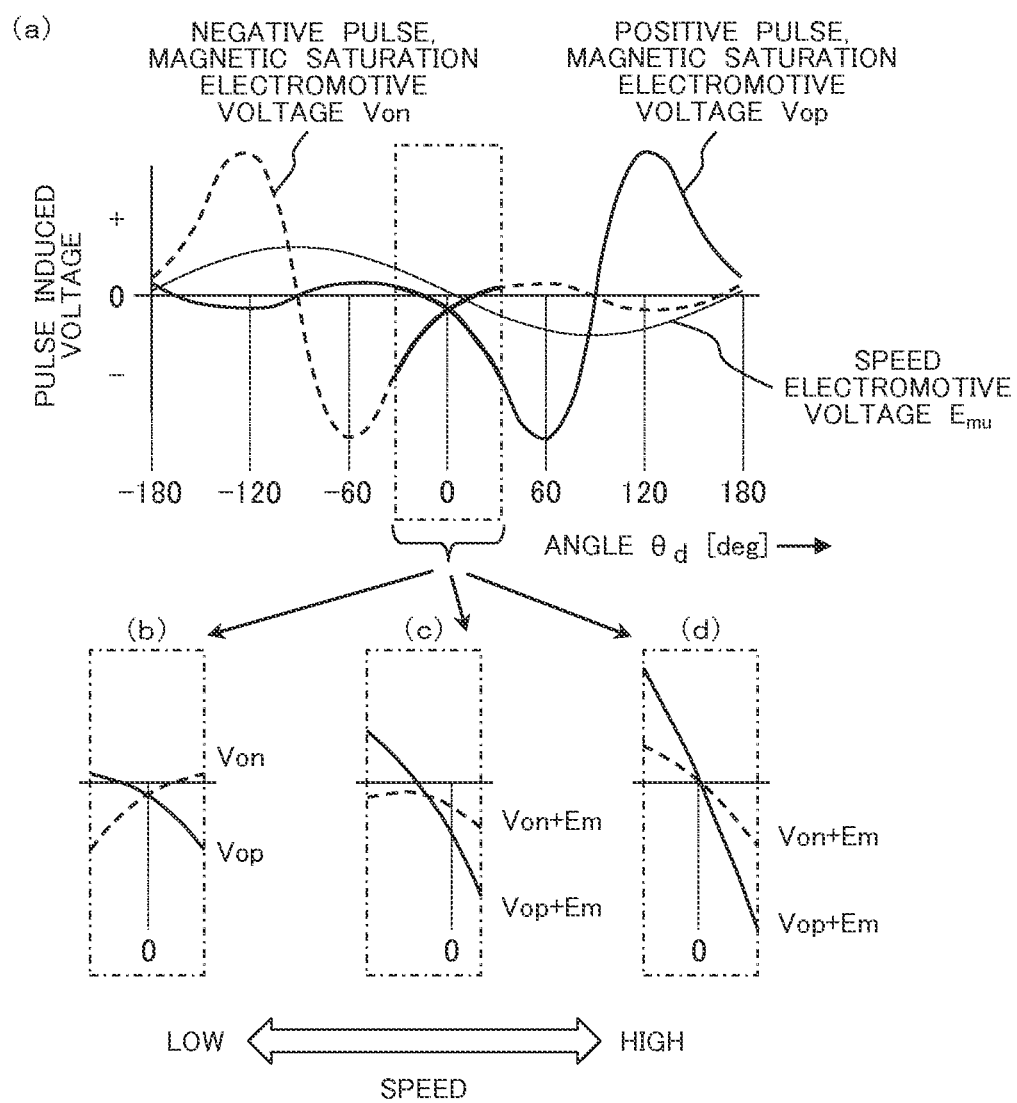
FIG. 23 is an explanatory drawing of a relationship between a magnetic saturation electromotive voltage and a speed electromotive voltage.

The above workings will be described with reference to FIG. 23. As stated above, the magnetic saturation electromotive voltage is generated as a value that purely depends on the position of the rotor. However, since a speed electromotive voltage associated with the rotation of the rotor has concurrently been added, an error occurs in a relationship between a detected voltage and a phase as the number of rotations increases. FIG. 23(a) shows the phase of the rotor, magnetic saturation electromotive voltage, and the speed electromotive voltage. The electromotive voltage of the de-energized phase changes according to speed, which is shown in FIGS. 23(b) to 23(d).

When the speed is extremely low as being in the zero-speed vicinity, the pure magnetic saturation electromotive voltages Vop (at the time of the positive pulse application) and Von (at the time of the negative pulse application) are detected as shown in FIG. 23(b). However, as the speed increases, the speed electromotive voltage Em that depends on the speed is added to the Vop and Von as shown in FIGS. 23(c) and 23(d). Accordingly, if the speed electromotive voltage component can be separated or eliminated, phase information becomes more accurate.

Therefore, since the speed electromotive voltage is added to both the magnetic saturation electromotive voltage at the time of the positive pulse application and the magnetic saturation electromotive voltage at the time of the negative pulse application, by subtracting the detected value, it is possible to nullify the speed electromotive voltage component.

The above function is provided for the phase estimator 22D in FIG. 22. The phase estimator 22D calculates a difference between the BL1 (magnetic saturation electromotive voltage at the time of the positive pulse application) and BL2 (magnetic saturation electromotive voltage at the time of the negative pulse application) by a subtracter 207. By doing so, the speed electromotive voltage is nullified, and highly-accurate position estimation in a broader range can be expected.

EXAMPLE 5

Next, a fifth embodiment of the present invention will be described with reference to FIG. 24.

Figure 9:
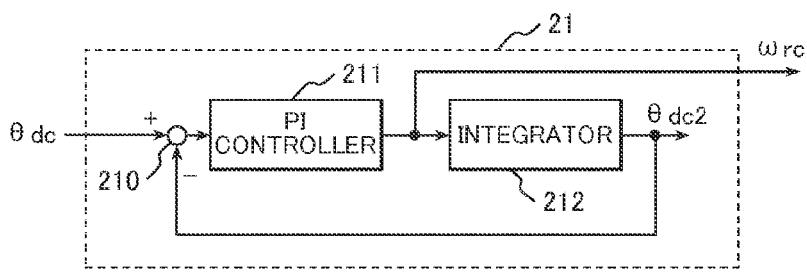
FIG. 9 is a block diagram of a speed estimator shown in FIG. 8.
Figure 24:
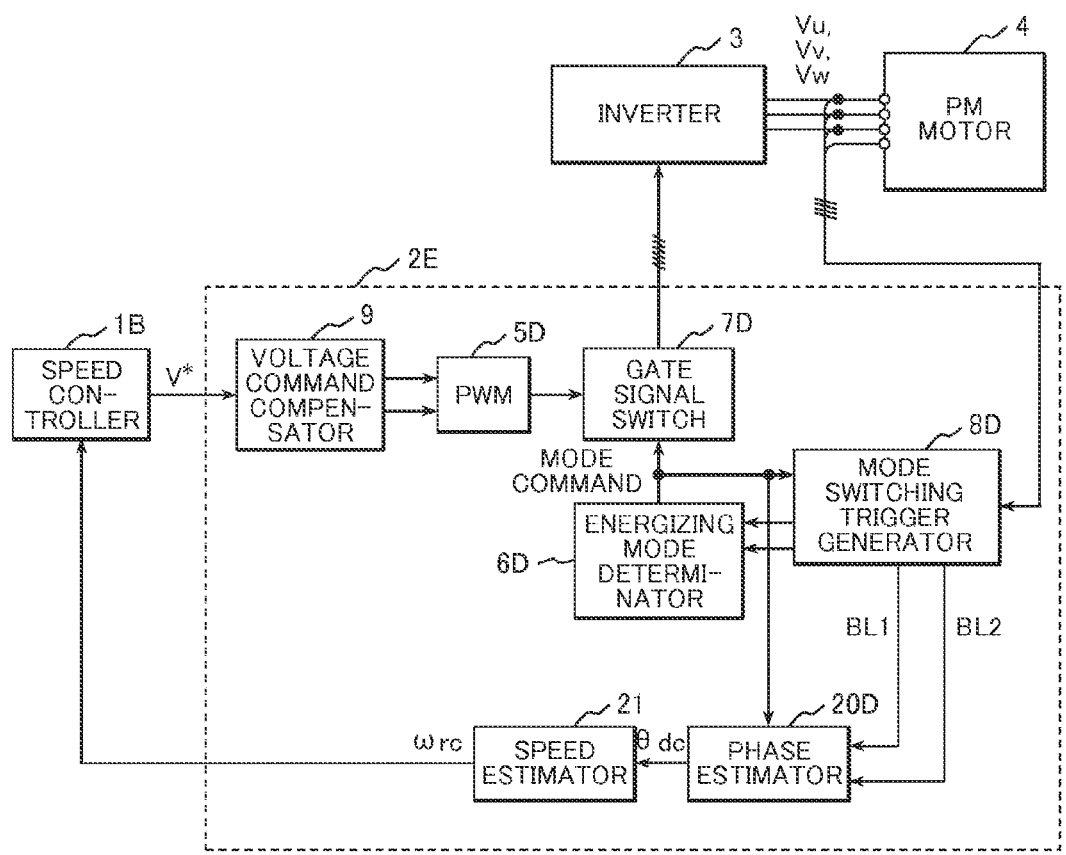
FIG. 24 is a block diagram of a synchronous motor system in accordance with another example of the present invention.

FIG. 24 shows a synchronous motor speed control system in accordance with the fifth embodiment, wherein a speed estimator 21 shown in FIG. 9 is added to the position control system described in the fourth embodiment, thereby configuring a speed control system. Therefore, each component in FIG. 24 is the same as the component described in the aforementioned embodiments, and their operations and workings are as described above.

The phase (rotor position) θdc from the phase estimator 20D is entered into the speed estimator 21, and an estimated calculation of the rotor speed ωrc is performed. The speed estimator 21 is the same as that shown in FIG. 9 which is described in the second embodiment.

As stated above, since the phase estimation accuracy has been increased in the fourth embodiment, the fifth embodiment, which adds a speed estimator 21 to the fourth embodiment, can achieve further accurate rotation speed estimation.

EXAMPLE 6

Next, a sixth embodiment of the present invention will be described with reference to FIGS. 25 and 26.

Figure 25:
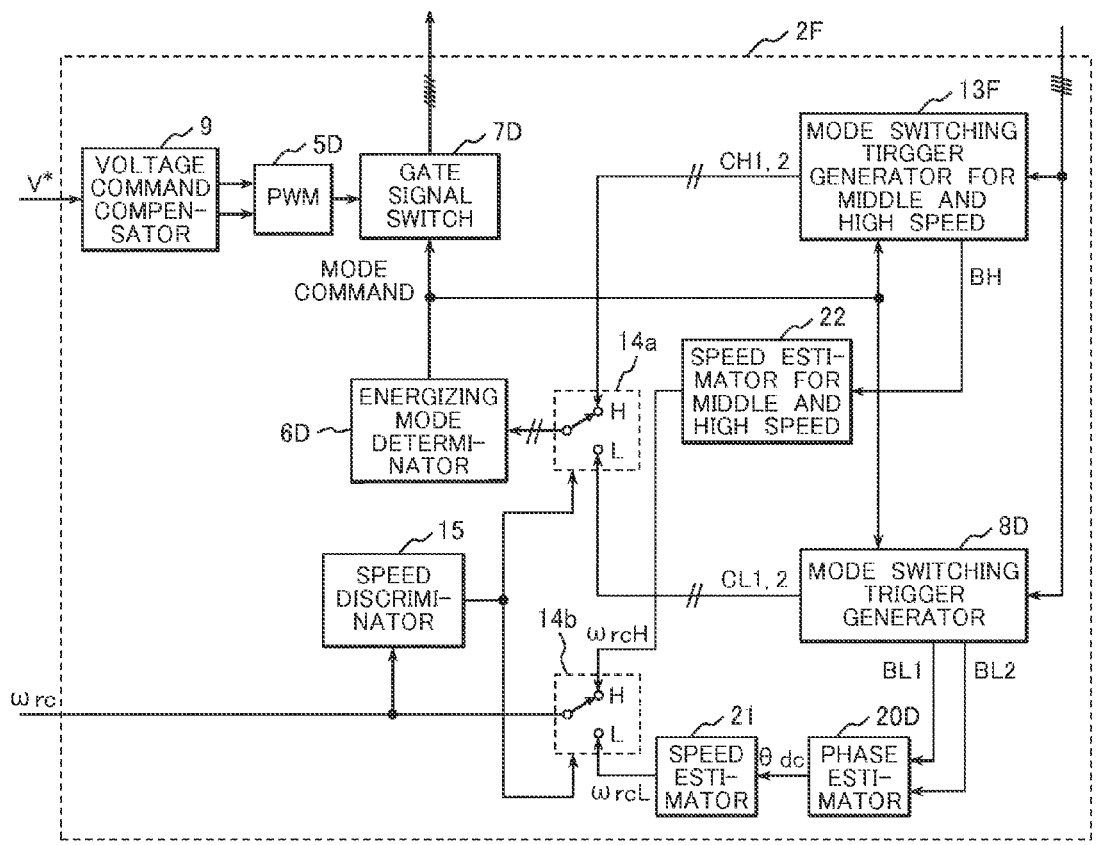
FIG. 25 is a block diagram of a synchronous motor system in accordance with another example of the present invention.

FIG. 25 shows a synchronous motor speed control system in accordance with the sixth embodiment, wherein the controller 2C of the speed control system shown in FIG. 10 described in the third embodiment is replaced by a controller 2F shown in FIG. 25.

Principally, the controller 2F in FIG. 25 has the same configuration as that of the controller 2C in FIG. 10. In this embodiment, a PWM generator 5D, an energizing mode determinator 6D, a gate signal switch 7D, a mode switching trigger generator 8D, a voltage command compensator 9, a speed discriminator 15, and a phase estimator 20D used in the fourth embodiment (Example 4) are adopted, and a mode switching trigger generator for middle and high speed 13F is newly added. The basic operations are the same as those of the third and fourth embodiments; however, the mode switching trigger generator for middle and high speed 13F is a significantly characteristic part of this embodiment.

Figure 26:
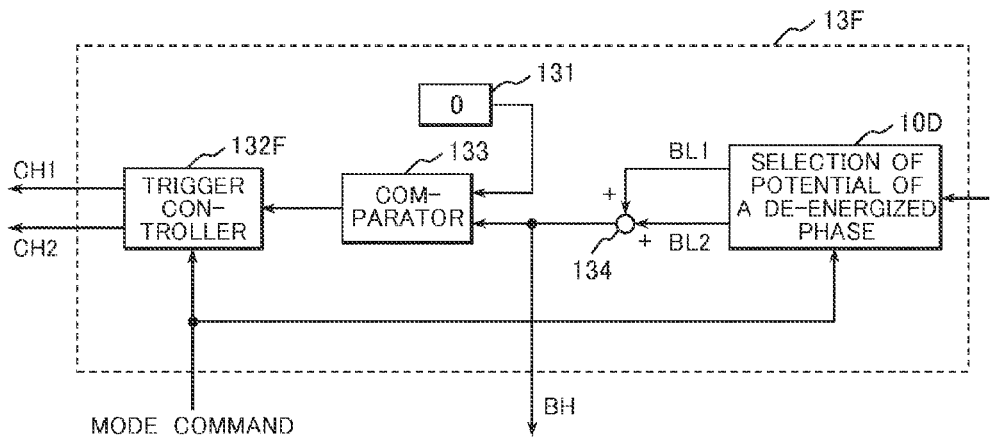
FIG. 26 is a block diagram of a speed estimator for middle and high speed shown in FIG. 25.

FIG. 26 is a block diagram of a mode switching trigger generator for middle and high speed 13F. Although the mode switching trigger generator for middle and high speed 13F principally operates in the same way as that of the third embodiment shown in FIG. 11, the electromotive voltage entered into a comparator 133 is different.

As a de-energized phase potential selector 10D, the de-energized phase potential selector 10D of the fourth embodiment shown in FIG. 16 is used; and the sum of two electromotive voltages, which are the electromotive voltage BL1 at the time of the positive pulse application and the electromotive voltage BL2 at the time of the negative pulse application, is calculated by an adder 134.

The comparator 133 compares the obtained additional value with a reference voltage "zero" from a zero generator 131, thereby creating an energizing mode switching trigger signal. In addition, the additional value BH is entered into the speed estimator for middle and high speed 22 to estimate the speed.

By doing so, it is possible to increase speed estimation accuracy and position estimation accuracy in the middle and high speed zone. That is, because a control is performed based on the speed electromotive voltage in the middle and high speed zone, the magnetic saturation electromotive voltage serves as a disturbance, resulting in decreased estimation accuracy.

Therefore, by adding the electromotive voltage at the time of the positive pulse application and the electromotive voltage at the time of the negative pulse application, it is possible to eliminate the adverse effect of those magnetic saturation electromotive voltages and retrieve only a pure speed electromotive voltage.

Thus, according to a synchronous motor speed control system in accordance with the sixth embodiment of the present invention, it is possible to provide a highly accurate and stable synchronous motor speed control system in a wide rotation speed range from the zero-speed vicinity through the high speed zone.

EXAMPLE 7

Next, a seventh embodiment of the present invention will be described with reference to FIG. 27.

Figure 27:
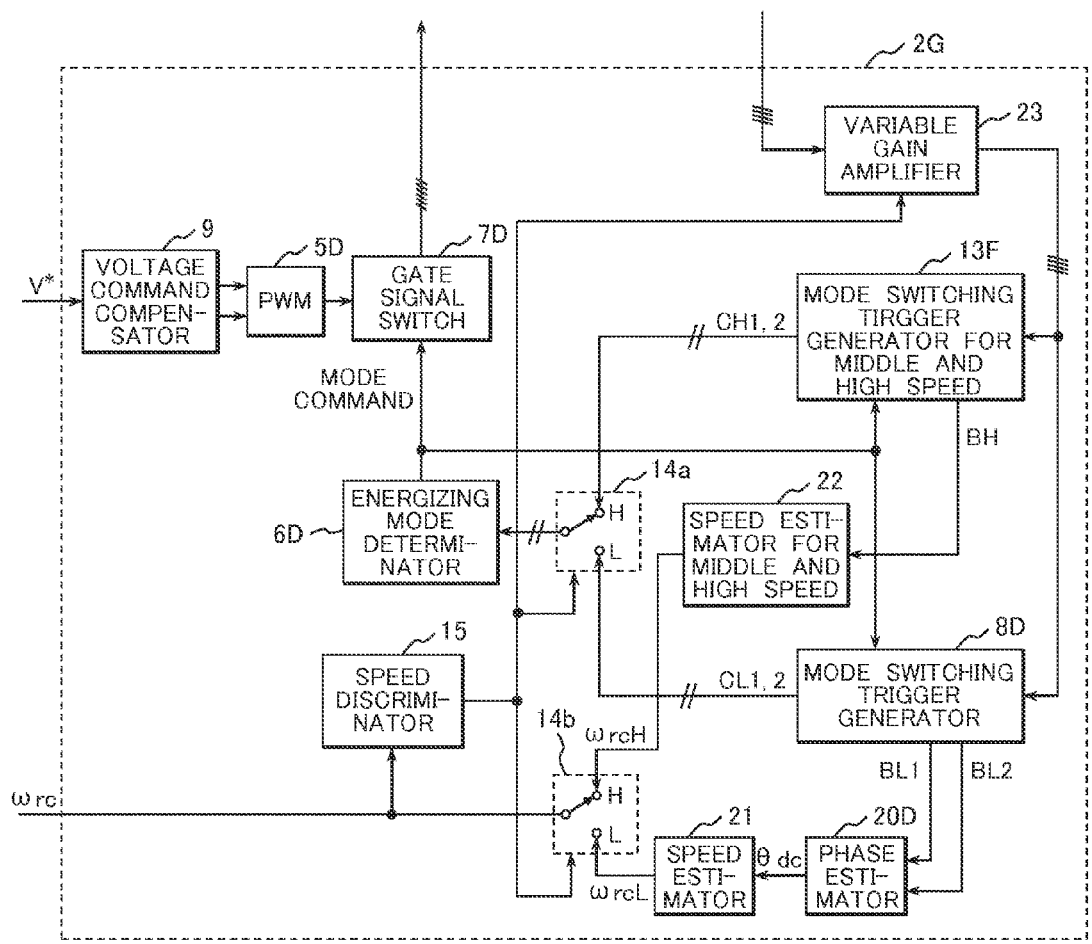
FIG. 27 is a block diagram of a synchronous motor system in accordance with another example of the present invention.

FIG. 27 shows a synchronous motor speed control system in accordance with the seventh embodiment, wherein the controller 2F of the speed control system shown in FIG. 25 described in the sixth embodiment is replaced by a controller 2G shown in FIG. 27.

Principally, the controller 2G shown in FIG. 27 has the same configuration as that of the controller 2F in FIG. 25. However, one different point is that a variable gain amplifier 23 is newly added to the terminal voltage detecting portion of the synchronous motor 4. Other parts are the same as those of the controller 2F shown in FIG. 25.

As stated above, position or speed is estimated by using the magnetic saturation electromotive voltage in the low-speed zone, while position or speed is estimated by using the speed electromotive voltage in the middle and high speed zone. By doing so, it is possible to provide a highly accurate and stable synchronous motor speed control system.

Although both the magnetic saturation electromotive voltage and the speed electromotive voltage are generated in the de-energized phase, their absolute values are different.

Since the magnetic saturation electromotive voltage is generated due to the unbalance of the magnetic circuit, the voltage value is between several percents and more than ten percents of the rated voltage of the electric motor. On the other hand, the value of the speed electromotive voltage is nearly 100% at a maximum speed.

Accordingly, it is difficult to accurately detect both of the two voltages by means of an electronic circuit with the same gain. It is preferable that the gain be increased when using the magnetic saturation electromotive voltage to increase accuracy, while the gain be decreased in the middle and high speed zone.

Accordingly, in the seventh embodiment of the present invention, a variable gain amplifier 23 that can change the gain is provided in the front stage of the de-energized phase detecting portion. The gain of the variable gain amplifier 23 can be changed in conjunction with the output from the speed discriminator 15. If the gain is set high in the low-speed zone and set low in the middle and high speed zone, or the gain is set so as to become linear (proportional) depending on the speed, uniform detection accuracy can be obtained in all speed zones, which makes it possible to achieve a stable speed control system in a wide range of speed zone.

EXAMPLE 8

Next, an eighth embodiment of the present invention will be described with reference to FIG. 28.

Figure 28:
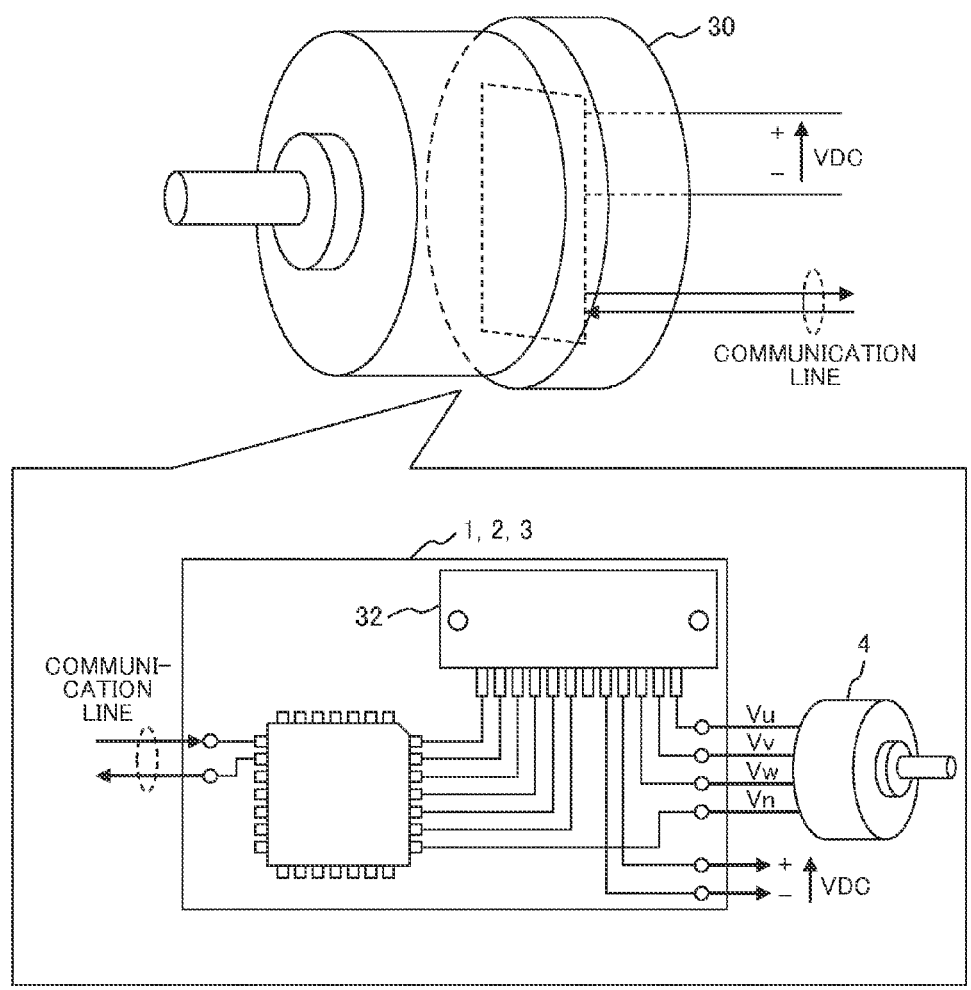
FIG. 28 is a block diagram of a synchronous motor system in accordance with another example of the present invention.

FIG. 28 shows a synchronous motor drive system in accordance with the eighth embodiment, wherein a drive system in accordance with any one of the aforementioned embodiments is incorporated in the chassis of the synchronous motor's main body, thereby integrating the mechanical components and the electrical components into one unit.

An applied voltage command generator 1, a controller 2, and an inverter 3, which are the components of a drive system in accordance with any one of the aforementioned embodiments, are incorporated in the chassis 30 shown in FIG. 28; and a direct-current power source 31 and a communication line for sending and receiving commands and operating status data to and from the synchronous motor are only located outside the chassis 30.

By integrating a synchronous motor drive system into one unit, the size of the drive system can be reduced and also pulling-out of wires becomes unnecessary.

Since the synchronous motor drive system in accordance with the present invention does not require a rotor position sensor or a speed sensor, it is possible to make the entire drive system compact.

EXAMPLE 9

Next, an electrical hydraulic pump system in accordance with the present invention will be described with reference to FIGS. 29 and 30.

Figure 29:
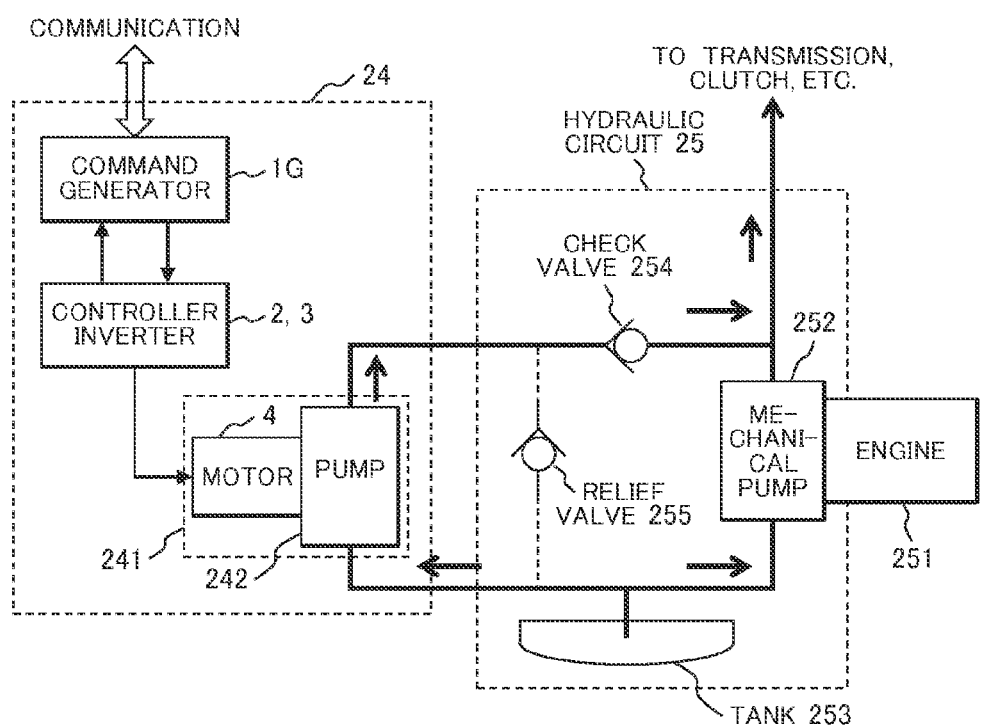
FIG. 29 is a block diagram of an electrical hydraulic pump system.
Figure 30:
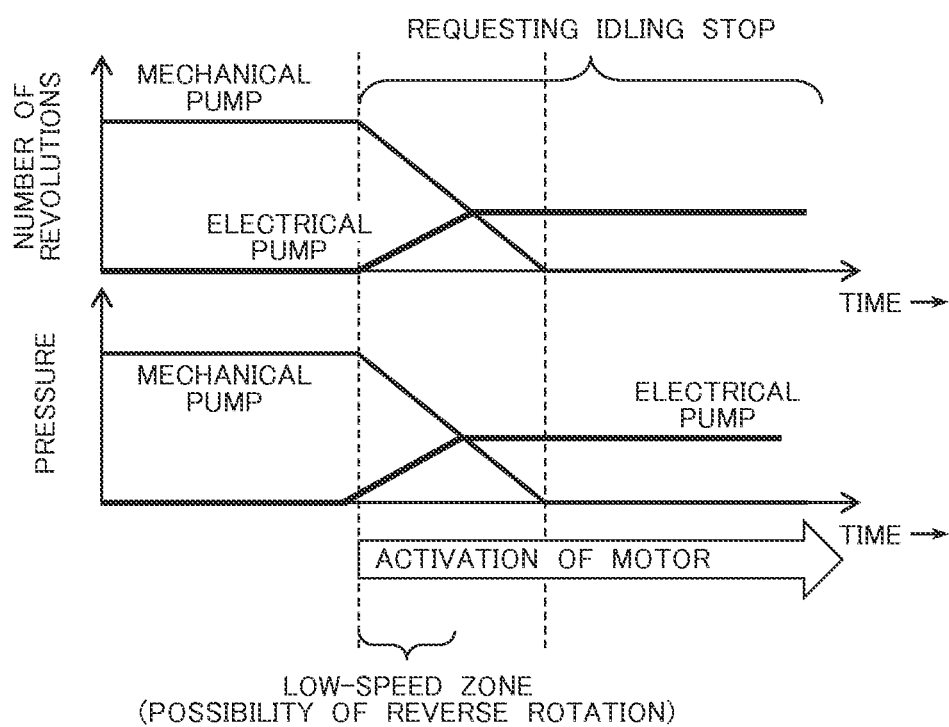
FIG. 30 is an explanatory drawing of the operating waveform of an electrical hydraulic pump.

FIG. 29 shows an electrical hydraulic pump system that is driven while an automobile engine is stopped. This system is used during the time when an automobile engine is idled and stopped, and also used to provide oil pressure for the transmission, clutch, and brake of such cars as hybrid cars in which their engines are completely stopped.

In FIG. 29, callout No. 24 indicates a synchronous motor drive system in accordance with any one of the aforementioned embodiments, and an electrical pump 241 comprises an electric motor 4 and a pump 242.

While an engine 251 is stopped, oil pressure of a hydraulic circuit 25 is generated by the electrical pump 241, and the oil pressure is transmitted to the hydraulic circuit 25. Herein, the hydraulic circuit 25 comprises a mechanical pump 252 driven by the engine 251, a tank 253 for storing oil, and a check valve 254 for preventing back-flow from the mechanical pump 252 to the electrical pump 241.

Conventional electrical hydraulic pump systems are equipped with a relief valve 255 to keep oil pressure below the preset value, while the system in accordance with this embodiment can eliminate the relief valve.

Next, operation of the electrical hydraulic pump system in accordance with this embodiment will be described with reference to FIG. 30.

While the engine 251 rotates and the mechanical pump 252 creates sufficient oil pressure, the electrical pump stops operating, and the oil pressure is generated by the mechanical pump 252.

At the time when the engine 251 stops operating during such time as idling stop, the number of rotations of the mechanical pump 252 decreases accordingly, causing the discharge pressure of the mechanical pump 252 to begin to decrease.

On the other hand, the electrical pump 241 starts to operate, the pump 242 rotates by means of an electric motor 4, and oil pressure begins to be generated. At the time when the discharge pressure of the mechanical pump 252 and that of the electrical pump 241 are reversed, the check valve 254 opens, and oil pressure is provided by the electrical pump 241.

At that time, it is preferable that the electrical pump 241 starts to be operated before the mechanical pump 252, that is, the engine, stops operating so that oil pressure provided by the electrical pump becomes sufficient at the time when oil pressure provided by the mechanical pump 252 decreases below the oil pressure provided by the electrical pump 241 when the engine 251 stops operating. Specifically, it is preferable that the start of the operation of the electrical pump 241 be set at the time the engine stop is instructed, or before or after the instruction.

Also, because oil pressure provided by the mechanical pump 252 increases with the rotation of the engine 251 even at the restart of the engine 251, it is preferable that the electrical pump be operated until oil pressure provided by the mechanical pump 252 becomes greater than the oil pressure provided by the electrical pump 241 while the engine is stopped.

For example, it is preferable that the electrical pump 241 be operated until oil pressure provided by the mechanical pump 252 driven by the engine 251 becomes a given value, or the time for driving the electrical pump 241 be set based on the time from restarting of the engine 251.

Hereinafter, operation of the relief valve of conventional systems will be described.

For the check valve 254 to open, pressure of the electrical pump 241 must be greater than the pressure of the mechanical pump 252. However, the pressure changes according to the load of the hydraulic circuit or temperature, and in some cases, an excess load is exerted on the electrical pump 241.

On that occasion, it is necessary for the relief valve 255 to open so as to release the oil pressure and reduce the load exerted on the electrical pump 241. If the relief valve 255 is not provided, the electric motor 4 reversely rotates and steps out in the low-speed zone, and the electrical pump 241 cannot provide oil pressure.

If the electrical pump 241 fails to provide the discharge pressure or the discharge pressure becomes insufficient, oil pressure provided by the mechanical pump 252 increases, or oil pressure transmitted to the transmission and clutch becomes insufficient at the stop of the idling before discharge pressure is provided by redriving the electrical pump. As a result, automobiles start moving late or start shock could possibly occur.

As mentioned in the description of the conventional technology, the reason why the electric motor 4 steps out or stops is that there was no technology for accurately estimating the rotor position in the low-speed zone. If a rotor position sensor is attached, this problem will be solved. However, reliability of the sensor or wiring, installation, and adjusting procedures might cause new problems.

Since the synchronous motor drive system in accordance with this embodiment can accurately estimate the rotor position, it is possible to stably drive the electric motor from the stop state through the high speed zone. Thus, it is possible to effectively prevent such a problem as a step-out.

According to this embodiment, the number of rotations of a motor can be estimated at arbitrary timing. Therefore, it is possible to prevent controllability from deteriorating due to a prolonged estimation period at the time of slow rotation in proportion to the number of rotations as conventional methods. It is also possible to prevent overshoot, which could result in a motor stop or overspeed, due to hunting or rapid change of load or target rotations.

Furthermore, according to this embodiment, it is possible to stably drive a motor from the stop state, which makes it possible to eliminate the relief valve 255 as shown in FIG. 29. As a result, wasted motion of the electrical pump due to the relief pressure is eliminated, and it is possible to provide a highly-efficient and quiet electrical hydraulic system.

The invention claimed is:

1. A synchronous motor drive system comprising
an inverter connected to a three-phase synchronous motor and comprised of a plurality of switching elements, and
a controller for selecting two energized phases of the three-phase windings of said three-phase synchronous motor and controlling the energization of said inverter according to six different energizing modes by means of pulse-width modulation; wherein
said controller comprising
an energizing mode switching means for detecting at least either a terminal voltage of a de-energized phase of said three-phase windings or a connection point voltage of a stator winding of said three-phase synchronous motor and sequentially switching said energizing mode according to the detected voltage, and a rotation count computing means for retaining an instantaneous value one or more samples earlier of an instantaneous voltage which is detected on a predetermined sampling period, calculating a difference value between said voltage retained at the time when the sign of said detected voltage was inverted and a currently detected voltage, and calculating the number of rotations of said three-phase synchronous motor based on the difference value, in an area where the rotation speed of said three-phase synchronous motor is from zero through low speed.

2. A synchronous motor drive system comprising:

an inverter connected to a three-phase synchronous motor and comprised of a plurality of switching elements, and a controller for selecting two energized phases of the three-phase windings of said three-phase synchronous motor and controlling the energization of said inverter according to six different energizing modes by means of pulse-width modulation; wherein said controller comprising an energizing mode switching means for detecting at least either a terminal voltage of a de-energized phase of said three-phase windings or a connection point voltage of a stator winding of said three-phase synchronous motor and sequentially switching said energizing mode according to the detected voltage, a voltage command means for applying, to respective energized phases in said six different energizing modes, at least either a pulse voltage that generates normal rotation torque with regard to said synchronous motor or a pulse voltage that generates reverse rotation torque with regard to said synchronous motor, or applying both of the pulse voltages, and a rotor position information computing means for calculating rotor position information of said three-phase synchronous motor from an instantaneous voltage during the pulse application period by means of said voltage command means;

wherein said rotor position information computing means calculates a difference value between said instantaneous voltage detected when said positive pulse is applied and said instantaneous voltage detected when said negative pulse is applied and calculates rotor position information of said synchronous motor based on the difference value, in an area where the rotation speed of said three-phase synchronous motor is from zero through low speed.

3. A synchronous motor drive system comprising:

an inverter connected to a three-phase synchronous motor and comprised of a plurality of switching elements, and a controller for selecting two energized phases of the three-phase windings of said three-phase synchronous motor and controlling the energization of said inverter according to six different energizing modes by means of pulse-width modulation; wherein said controller comprising an energizing mode switching means for detecting at least either a terminal voltage of a de-energized phase of said three-phase windings or a connection point voltage of a stator winding of said three-phase synchronous motor and sequentially switching said energizing mode according to the detected voltage, a voltage command means for applying, to respective energized phases in said six different energizing modes, at least either a pulse voltage that generates normal rotation torque with regard to said synchronous motor or a pulse voltage that generates reverse rotation torque with regard to said synchronous motor, or applying both of the pulse voltages, a rotor position information computing means for calculating rotor position information of said three-phase synchronous motor from an instantaneous voltage during the pulse application period by means of said voltage command means, and a rotor speed information computing means for obtaining rotor speed of said three-phase synchronous motor according to the change status of a plurality of pieces of rotor position information obtained by said rotor position information computing means;

wherein said rotor position information computing means calculates a difference value between said instantaneous voltage detected when said positive pulse is applied and said instantaneous voltage detected when said negative pulse is applied and calculates rotor position information of said synchronous motor based on the difference value, in an area where the rotation speed of said three-phase synchronous motor is from zero through low speed.

4. A synchronous motor drive system comprising:

an inverter connected to a three-phase synchronous motor and comprised of a plurality of switching elements, and a controller for selecting two energized phases of the three-phase windings of said three-phase synchronous motor and controlling the energization of said inverter according to six different energizing modes by means of pulse-width modulation; wherein said controller comprising an energizing mode switching means for detecting at least either a terminal voltage of a de-energized phase of said three-phase windings or a connection point voltage of a stator winding of said three-phase synchronous motor and sequentially switching said energizing mode according to the detected voltage, a voltage command means for applying, to respective energized phases in said six different energizing modes, at least either a pulse voltage that generates normal rotation torque with regard to said synchronous motor or a pulse voltage that generates reverse rotation torque with regard to said synchronous motor, or applying both of the pulse voltages, a rotor position information computing means for calculating rotor position information of said three-phase synchronous motor from an instantaneous voltage during the pulse application period by means of said voltage command means, and a rotor speed information computing means for obtaining rotor speed of said three-phase synchronous motor according to the change status of a plurality of pieces of rotor position information obtained by said rotor position information computing means, wherein said rotor position information computing means calculates a difference value between said instantaneous voltage detected when said positive pulse is applied and said instantaneous voltage detected when said negative pulse is applied and calculates rotor position information of said synchronous motor based on the difference value, and said rotor speed information computing means calculates rotation speed of said synchronous motor according to the change rate of the rotor position information obtained by said rotor position information computing means, in an area where the rotation speed of said three-phase synchronous motor is from zero through low speed.

5. A synchronous motor drive system comprising:
an inverter connected to a three-phase synchronous motor and comprised of a plurality of switching elements, and
a controller for selecting two energized phases of the three-phase windings of said three-phase synchronous motor and controlling the energization of said inverter according to six different energizing modes by means of pulse-width modulation; wherein
said controller comprising
an energizing mode switching means for detecting at least either a terminal voltage of a de-energized phase of said three-phase windings or a connection point voltage of a stator winding of said three-phase synchronous motor and sequentially switching said energizing mode according to the detected voltage,
a voltage command means for applying, to respective energized phases in said six different energizing modes, at least either a pulse voltage that generates normal rotation torque with regard to said synchronous motor or a pulse voltage that generates reverse rotation torque with regard to said synchronous motor, or applying both of the pulse voltages,
a rotor position information computing means for calculating rotor position information of said three-phase synchronous motor from an instantaneous voltage during the pulse application period by means of said voltage command means, and
a rotor speed information computing means for obtaining rotor speed of said three-phase synchronous motor according to the change status of a plurality of pieces of rotor position information obtained by said rotor position information computing means, wherein
said rotor position information computing means calculates an additional value of said instantaneous voltage detected when said positive pulse is applied and said instantaneous voltage detected when said negative pulse is applied and calculates rotor position information of said synchronous motor based on the additional value,
said rotor speed information computing means calculates rotation speed of said synchronous motor according to the change rate of the rotor position information obtained by said rotor position information computing means; and
said rotor position information computing means retains said additional value for a period of more than one sampling and calculates rotation speed of said synchronous motor based on a difference value between a currently obtained additional value and said previous additional value retained for a period of more than one sampling, in an area where the rotation speed of said three-phase synchronous motor is from zero through low speed.

6. A synchronous motor drive system comprising:
an inverter connected to a three-phase synchronous motor and comprised of a plurality of switching elements, and
a controller for selecting two energized phases of the three-phase windings of said three-phase synchronous motor and controlling the energization of said inverter according to six different energizing modes by means of pulse-width modulation; wherein
said controller comprising
an energizing mode switching means for detecting at least either a terminal voltage of a de-energized phase of said three-phase windings or a connection point voltage of a stator winding of said three-phase synchronous motor and sequentially switching said energizing mode according to the detected voltage,
a voltage command means for applying, to respective energized phases in said six different energizing modes, at least either a pulse voltage that generates normal rotation torque with regard to said synchronous motor or a pulse voltage that generates reverse rotation torque with regard to said synchronous motor, or applying both of the pulse voltages,
a rotor position information computing means for calculating rotor position information of said three-phase synchronous motor from an instantaneous voltage during the pulse application period by means of said voltage command means, and
a rotor speed information computing means for obtaining rotor speed of said three-phase synchronous motor according to the change status of a plurality of pieces of rotor position information obtained by said rotor position information computing means, wherein
said rotor position information computing means comprises
a first rotor position information computing means for calculating a difference value between said instantaneous voltage detected when said positive pulse is applied and said instantaneous voltage detected when said negative pulse is applied and calculating rotor position information of said synchronous motor based on the difference value, and
a second rotor position information computing means for calculating an additional value of said instantaneous voltage detected when said positive pulse is applied and said instantaneous voltage detected when said negative pulse is applied and calculating rotor position information of said synchronous motor based on the additional value; and
said rotor speed information computing means comprises
said first rotor speed information computing means for calculating rotation speed of said synchronous motor according to the change rate of rotation position information obtained by said first rotor position information computing means, and
said second rotor speed information computing means for calculating rotation speed of said synchronous motor according to the change rate of rotation position information obtained by said second rotor position information computing means;
said first rotor speed information computing means and said second rotor speed information computing means are switched by a switching means according to the rotation speed of said synchronous motor, in an area where the rotation speed of said three-phase synchronous motor is from zero through low speed.

\* \* \* \* \*